United States Patent
Isaksson et al.

(10) Patent No.: US 6,466,629 B1
(45) Date of Patent: Oct. 15, 2002

(54) MULTI-CARRIER TRANSMISSION SYSTEMS

(75) Inventors: Mikael Isaksson; Magnus Johansson; Harry Tonvall; Lennart Olsson; Tomas Stefansson; Hans Ohman; Gunnar Bahlenberg; Anders Isaksson; Goran Okvist; Lis-Marie Ljunggren; Tomas Nordstrom; Lars-Ake Isaksson; Daniel Bengtsson; Siwert Hakansson; Ye Wen, all of Lulea (SE)

(73) Assignee: STMicroelectronics N.V., Amsterdam (NL)

( * ) Notice: Subject to any disclaimer, the term of this patent is extended or adjusted under 35 U.S.C. 154(b) by 0 days.

(21) Appl. No.: 09/147,756

(22) PCT Filed: Sep. 1, 1997

(86) PCT No.: PCT/SE97/01455
§ 371 (c)(1),
(2), (4) Date: May 28, 1999

(87) PCT Pub. No.: WO98/10550
PCT Pub. Date: Mar. 12, 1998

(30) Foreign Application Priority Data

Sep. 2, 1996 (SE) ................................................ 9603192

(51) Int. Cl.$^7$ ..................... H03K 9/00; H04L 27/06; H04L 27/14; H04L 27/22
(52) U.S. Cl. ................ 375/316; 375/243; 375/245; 341/155; 341/156; 341/158
(58) Field of Search .................. 375/316, 243, 375/245, 286, 287, 377; 341/155, 156, 158

(56) References Cited

U.S. PATENT DOCUMENTS

| | | | | |
|---|---|---|---|---|
| 4,509,036 A | * | 4/1985 | Furihata | 341/159 |
| 5,315,585 A | * | 5/1994 | Murphy et al. | 370/312 |
| 5,652,772 A | | 7/1997 | Isaksson et al. | 375/367 |

* cited by examiner

Primary Examiner—Mohammad H. Ghayour
(74) Attorney, Agent, or Firm—Lisa K. Jorgenson; Allen, Dyer, Doppelt, Milbrath & Gilchrist, P.A.

(57) ABSTRACT

A multi-carrier transmission system. A received multi-carrier signal is sampled and digitized before FFT processing. Multi-carrier signals consist of many narrow band carrier waves which convey data via a wide band channel. The amplitude distribution of the sum of all the individual carriers is Gaussian. This means that high amplitudes occur with low probability. At the present time, analog to digital converters have a limited dynamic range. It is therefore normal practice to provide a compromise between cutting and quantization noise. The adverse affects of a course quantization have to be balanced between signal distortions caused by the loss of the low probability high amplitude signals.

21 Claims, 16 Drawing Sheets

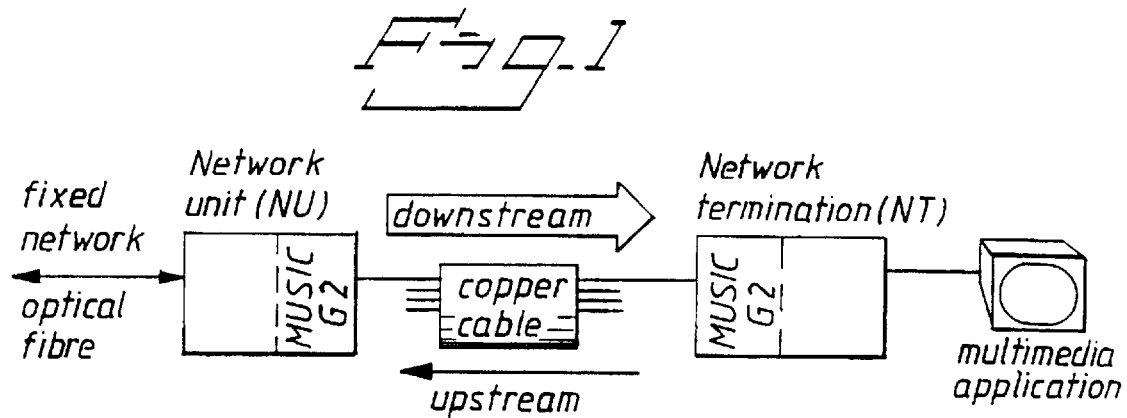
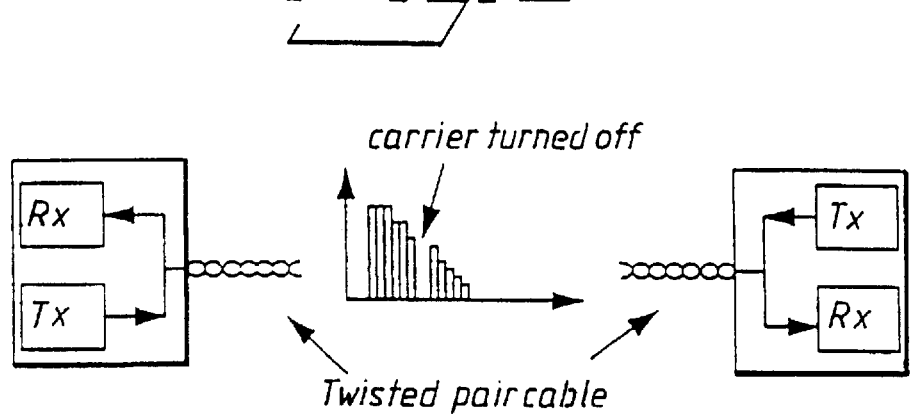
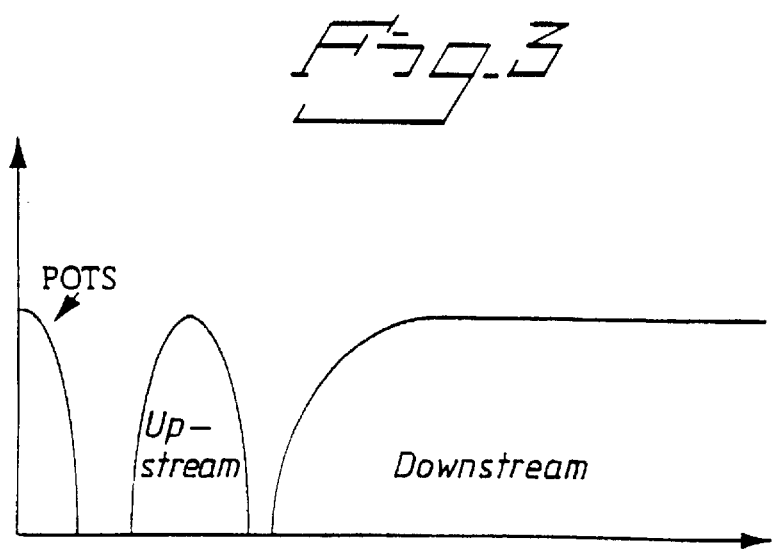

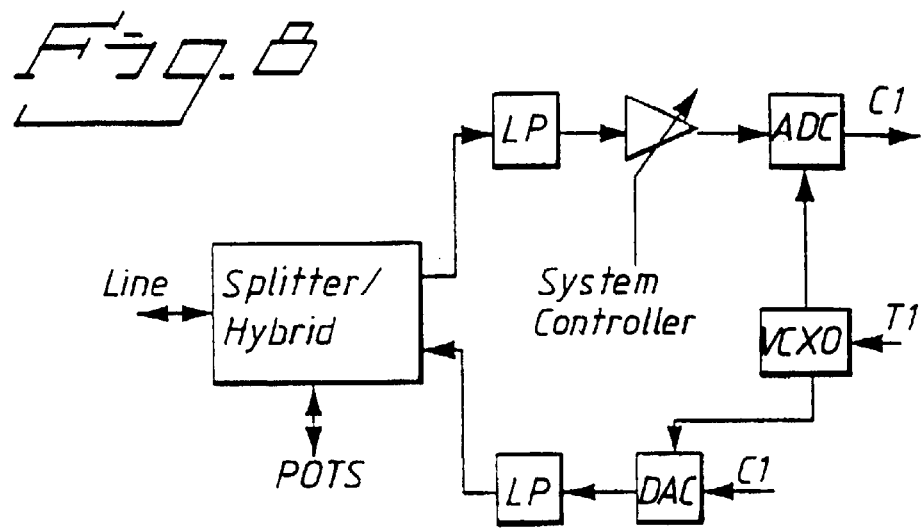
Fig. 8
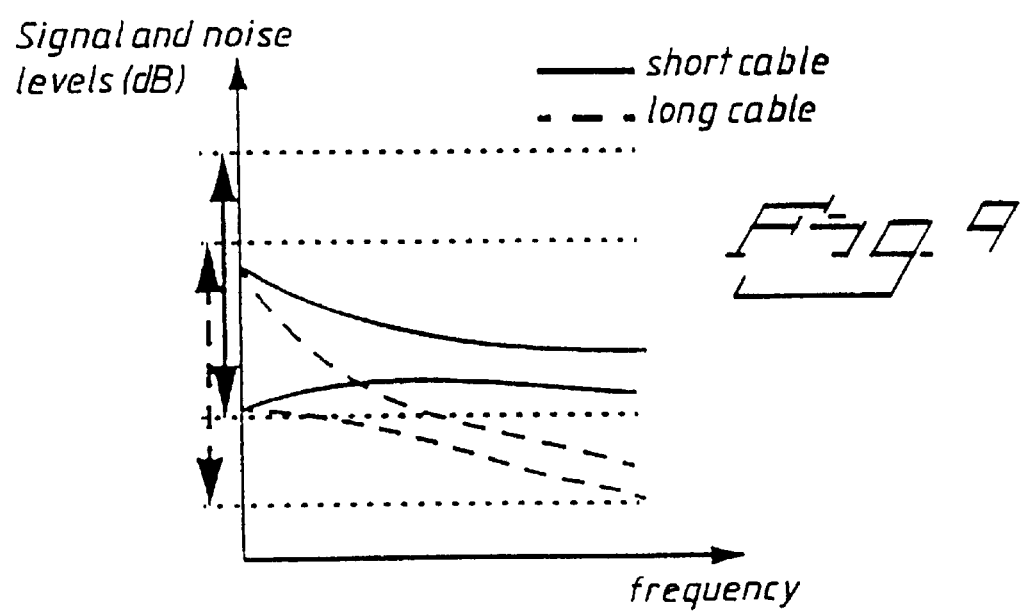
Fig. 9
Fig. 10

$$Z(k) = \sum_{i=0}^{6} Y(k-iM)$$

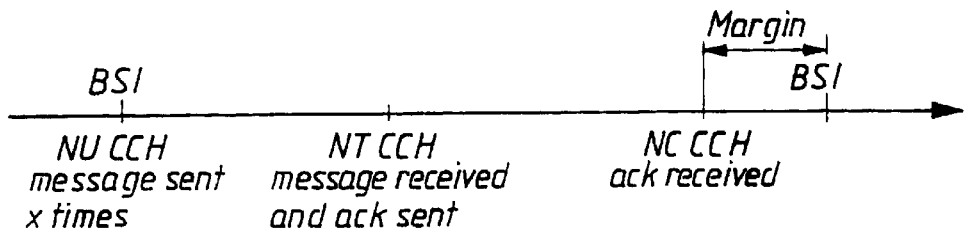
Fig. 24
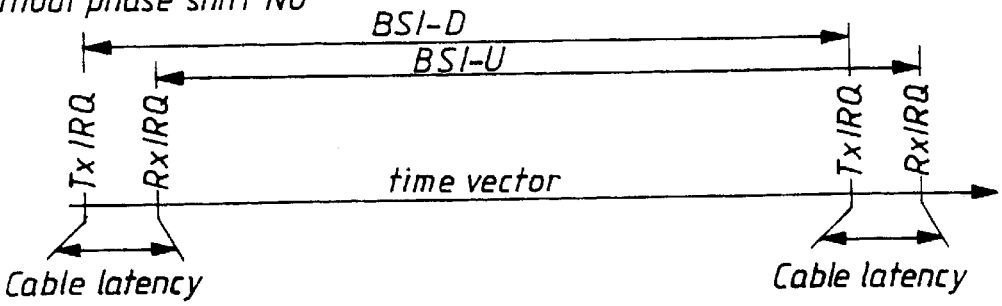
Fig. 25
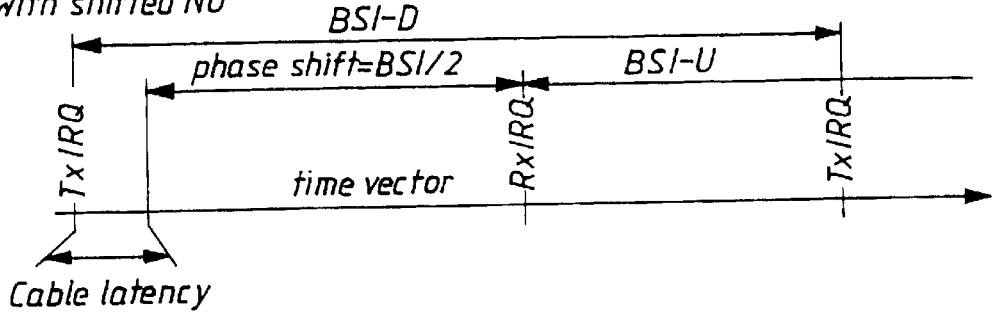
Fig. 26
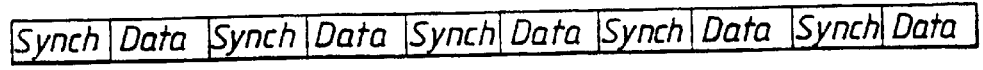
Fig. 27
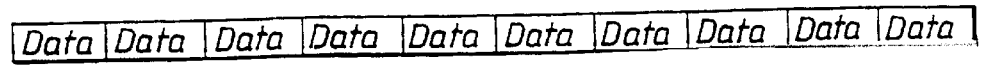

MULTI-CARRIER TRANSMISSION SYSTEMS

BACKGROUND OF THE INVENTION

1. Field of the Invention

The present invention relates to multi-carrier transmission systems in which the effects of cutting in the reception and sampling of multi-carrier signals is reduced, a transceiver and a receiver for use with such multi-carrier transmission systems, and a method, for use in such multi-carrier transmission systems, of reducing cutting in the reception and sampling of multi-carrier signals.

2. Discussion of the Background

The demand for provision of multi-media and other bandwidth services over telecommunications networks has created a need to transmit high bit rate traffic over copper pairs. This requirement has led to the development of a number of different transmission schemes, such as, ADSL and VDSL. One of the more likely modulation systems for all these transmission schemes is a line code known as DMT (discrete multi-tone), which bears some resemblance to orthogonal frequency division multiplex, and is a spread spectrum transmission technique.

In discrete multi-tone transmission, the available bandwidth is divided into a plurality of sub-channels each with a small bandwidth, 4kHz perhaps. Traffic is allocated to the different sub-channels in dependence on noise power and transmission loss in each sub-channel. Each channel carries multi-level pulses capable of representing up to 11 data bits. Poor quality channels carry fewer bits, or may be completely shut down.

Because inter pair interference in copper pair cables is higher where data is transmitted in both directions, i.e. symmetric duplex, a number of transmission schemes have proposed the use of asymmetric schemes in which high data rates are transmitted in one direction only. Such schemes meet many of the demands for high bandwidth services, such as, video-on-demand but, in the long term, symmetric duplex systems will be required.

VDSL technology resembles ADSL to a large degree, although ADSL must cater for much larger dynamic ranges and is considerably more complex as a result. VDSL is lower in cost and lower in power, and premises VDSL units need to implement a physical layer media access control for multiplexing upstream data.

Four line codes have been proposed for VDSL:

CAP; Carrierless AM/PM, a version of suppressed carrier QAM, for passive NT configurations, CAP would use QPSK upstream and a type of TDMA for multiplexing (although CAP does not preclude an FDM approach to upstream multiplexing);

DMT; Discrete Multi-Tone, a multi-carrier system using Discrete Fourier Transforms to create and demodulate individual carriers, for passive NT configurations; DMT would use FDM for upstream multiplexing (although DMT does not preclude a TDMA multiplexing strategy);

DWMT; Discrete Wavelet Multi-Tone, a multi-carrier system using Wavelet Transforms to create and demodulate individual carriers, DWMT also uses FDM for upstream multiplexing, but also allows TDMA; and SLC; Simple Line Code, a version of four-level baseband signalling that filters the base band and restores it at the receiver, for passive NT configurations; SLC would most likely use TDMA for upstream multiplexing, although FDM is possible.

Early versions of VDSL will use frequency division multiplexing to separate downstream from upstream channels and both of them from POTS and ISDN. Echo cancellation may be required for later generation systems featuring symmetric data rates. A rather substantial distance, in frequency, will be maintained between the lowest data channel and POTS to enable very simple and cost effective POTS splitters. Normal practice would locate the downstream channel above the upstream channel. However, the DAVIC specification reverses this order to enable premises distribution of VDSL signals over coaxial cable systems.

When a multi-carrier signal is received, it is sampled and digitised before FFT processing, (or wavelet transform processing). Multi-carrier signals consist of many narrow band carrier waves which convey data via a wide band channel. The amplitude distribution of the sum of all the individual carriers is Gaussian. This means that high amplitudes occur with low probability. At the present time, analogue to digital convertors have a limited dynamic range. It is, therefore, normal practice to provide a compromise between cutting and quantisation noise. This means that the adverse affects of a coarse quantisation have to be balanced against signal distortions caused by loss of the low probability high amplitude signals.

SUMMARY OF THE INVENTION

The present invention provides an alternative by detecting the occurrence of high amplitude signals and estimating the value of such signals by statistical means, and using the estimated signal value instead of the saturated value derived from the analogue to digital convertor. This technique minimises the effects of cutting, caused by saturation of an analogue to digital convertor operating with a limited dynamic range, and acceptable quantisation intervals.

It is an object of the present invention to provide a method of reducing cutting in analogue to digital conversion of a multi-carrier signal while operating with a limited dynamic range and maintaining acceptable quantisation intervals.

It is a further object of the present invention to provide a receiver for the reception of multi-carrier signals in which cutting is reduced in the analogue to digital conversion of a received multi-carrier signal while operating with a limited dynamic range and maintaining acceptable quantisation intervals.

It is a yet further object of the present invention to provide a transceiver having a receiver for the reception of multi-carrier signals in which cutting is reduced in the analogue to digital conversion of a received multi-carrier signal while operating with a limited dynamic range and maintaining acceptable quantisation intervals.

It is a still further object of the present invention to provide a multi-carrier transmission system having at least two transceivers, each including a receiver for the reception of multi-carrier signals in which cutting is reduced in the analogue to digital conversion of a received multi-carrier signal while operating with a limited dynamic range and maintaining acceptable quantisation intervals.

According to a first aspect of the present invention, there is provided a receiver, for use with a multi-carrier transmission system, said receiver including digitising means for sampling and quantising a received signal comprising a plurality of individual carriers, and processing means for digitally processing said sampled and quantised received signal to extract data modulated on said plurality of carriers, characterised in that said digitising means includes an analogue to digital convertor for converting said received signal to a series of digitised samples, each sample having n bits, an extremal detector for detecting when an analogue signal at an input to said analogue to digital convertor has an amplitude greater than that which can be represented by n bits, and generator means controlled by said extremal detector to generate m bits to represent each digitised sample, where m>n.

Said digitising means may be operative to minimise cutting of said digitised signal resulting from saturation of said analogue to digital convertor.

A number represented by said m bits may be determined by estimation from a Gaussian distribution of amplitudes.

Said received signal may be passed through analogue amplitude regulation means before passing to said input of said analogue to digital convertor.

Said generator means may be a 3-to-1 multiplexor having a first input arranged to receive an n bit output from said digital to analogue convertor, a second input arranged to receive an estimate of a positive amplitude value representative of an amplitude of a sample of said received signal greater than a positive saturation value of said analogue to digital convertor, a third input arranged to receive an estimate of a negative amplitude value representative of an amplitude of a sample of said received signal less than a negative saturation value of said analogue to digital convertor, and an output for an m bit signal representative of a predicted amplitude of said input signal.

Said multi-carrier transmission system may be an orthogonal frequency division multiplex radio transmission system.

Said multi-carrier transmission system may be a DMT transmission system.

Said multi-carrier transmission system may be a DMT based VDSL system.

A digitised output signal from said digitising means may be passed to an input of a FFT processor means.

A digitised output signal from said digitising means may be passed to an input of a wavelet transform processor means.

According to a second aspect of the present invention, there is provided a transceiver, including a transmitter and a receiver, characterised in that said receiver is a receiver as setout in the preceding paragraphs.

According to a third aspect of the present invention, there is provided a multi-carrier transmission system, characterised in that said multi-carrier transmission system includes two transceivers as set out in the preceding paragraph.

According to a fourth aspect of the present invention, there is provided a method of digitising an analogue multi-carrier signal comprising a plurality of individual carriers each of which is modulated with a data stream, in which said signal is sampled and quantised, characterised by the steps of:

sampling and quantising said analogue multi-carrier signal to produce a sequence of digital samples each of which contains n bits representing said sample amplitude;

detecting when an analogue multi-carrier signal sample has an amplitude greater than the maximum amplitude that can be represented by n bits; and generating a digital signal in which each sample is represented by m bits, where m>n.

Cutting of said digitised signal resulting from saturation of an analogue to digital convertor used for said sampling and quantization may be minimised.

A number represented by said m bits may be estimated from a Gaussian distribution of amplitudes.

Said analogue multi-carrier signal's amplitude may be regulated prior to sampling and quantization.

A positive amplitude for said analogue multi-carrier signal, greater than the positive saturation value of said analogue to digital convertor may be estimated, a negative amplitude for said analogue multi-carrier signal, less than the negative saturation value of said analogue to digital convertor may be estimated, and:

if a sample of said analogue multi-carrier signal has an amplitude lying between said positive and negative saturation values, an output of said analogue to digital convertor may be used to represent the amplitude of said sample of said analogue multi-carrier signal;

if a sample of said analogue multi-carrier signal has an amplitude greater than said positive saturation value, the estimated positive value of said amplitude may be used to represent the amplitude of said sample of said analogue multi-carrier signal; and if a sample of said analogue multi-carrier signal has an amplitude less than said negative saturation value, the estimated negative value of said amplitude may be used to represent the amplitude of said sample of said analogue multi-carrier signal.

Said multi-carrier signal may be an orthogonal frequency division multiplex signal.

Said multi-carrier transmission signal may be a DMT transmission signal.

BRIEF DESCRIPTION OF THE DRAWINGS

Embodiments of the invention will now be described, by way of example, with reference to the accompanying drawings, in which:

FIG. 1 illustrates, in schematic form, an asymmetric communications system.

FIG. 2 illustrates, in schematic form, a DMT system.

FIG. 3 illustrates, graphically, the channel separations used in an asymmetric DMT transmission system.

FIG. 8 illustrates, in schematic form, the analog interface for the multi-tone carrier system modem, shown in FIG. 4.

FIG. 9 illustrates, in graphical form, the dependence of signal-to-noise ratio on frequency for the multi-tone carrier system described herein.

FIG. 10 illustrates, in schematic form, the FFT algorithm used in the multi-tone carrier system modem, shown in FIG. 4.

FIG. 21 illustrates, in schematic form, an overview of the system controller interface used in the multi-tone carrier system modem, shown in

FIG. 4.

FIG. 24 illustrates, BSI length.

FIG. 25 illustrates, in schematic form, NU SC load distribution for BSI interrupts for the multi-tone carrier system modem, shown in FIG. 4.

FIG. 26 illustrates the SUS pattern for the multi-tone carrier system modem, shown in FIG. 4.

FIG. 27 illustrates the DAS pattern in schematic form, for the multi-tone carrier system modem, shown in FIG. 4.

DETAILED DESCRIPTION OF THE PREFERRED EMBODIMENTS

Figure 4:
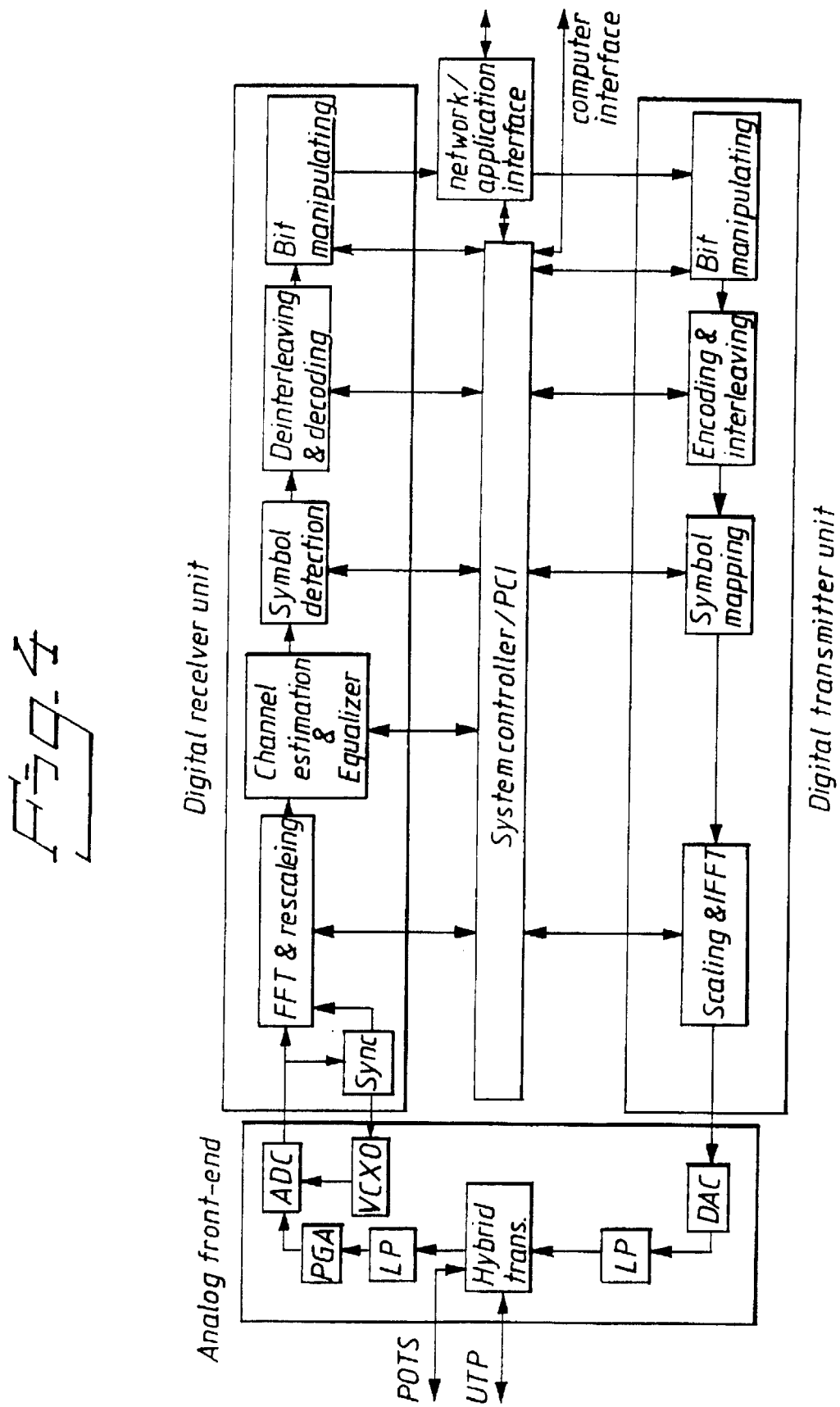
FIG. 4 illustrates, in schematic form, the basic blocks of a multi-tone carrier system modem to which the present invention relates.

To facilitate an understanding of the present invention, a glossary of the abbreviations used in this patent specification are set out below:

ADC: Analog-to-Digital Converter
AIS: Alarm In Signal
ASIC: Application Specific Integrated Circuit
BPSK: Binary Phase Shift Keying
BSI: Base synch interval
BSI-D: BSI for downlink connection
BSI-U: BSI for uplink connection
CCH: Control channel
CM1: Carrier mode 1, bit-loaded and used carrier
CM2: Carrier mode 2, masked out, or disabled, carrier
CM3: Carrier mode 3, zero bit-loading enabled carrier
CP: Cyclic Prefix
DAC: Digital-to-Analog Converter
DAS: DF3 frame sequence
DF1: Data frame, random data parallel CCH
DF2: Data frame, random data one CCH
DF3: Data frame, fully bit loaded one CCH
DMT: Discrete Multi Tone
DWMT: Discrete Wavelet Multi-Tone
EMC: Electro Magnetic Compatibility
FEC: Forward Error Correction
FEXT: Far End Cross Talk
FFT: Fast Fourier Transform
FTTN: Fibre To The Node
G1 MUSIC: generation one, prototype system (vme based)
G2 MUSIC: three+two ASIC implementation
G3 MUSIC: two chip silicon implementation
IFFT: Inverse Fast Fourier Transform
IIR: Infinite Impulse Response
ISDN: International Standard for Digital Networks
ISI: Inter-Symbol Interference
JTAG: Joint Test Action Group
LEX: Local Exchange
LP: Lowpass
NT: Network Termination
NU: Network Unit
OFDM: Orthogonal Frequency Division Multiplexing
ONU: Optical Network Unit
PGA: Programmable Gain Attenuator
POTS: Plain Old Telephony Service
QAM: Quadrature Amplitude Modulation
SC: System Controller
SDH: Synchronous Digital Hierarchy
SF: Synch frame
SNR: Signal-to-Noise Ratio
STB: Set Top Box
SUS: Synch frame sequence
SUS1: SF and DF1 frame sequence
SUS2: SF and DF2 frame sequence
TA: Time Advance
TDMA: Time Division Multiple Access
UTP: Unshielded Twisted Pair
VCXO: Voltage Controlled Crystal Oscillator
VDSL: Very high bit-rate Digital Subscriber Lines The system, to which the present invention relates, is for convenience referred to as MUSIC—MUlti-carrier System for the Installed Copper network. MUSIC is intended to provide high-speed communication on telephone copper wire pairs for supporting broadband multimedia services.

The MUSIC system, described in this, and the cross referenced patent specifications . . . , offers a cost-effective robust customer implementation in silicon, providing 26:2 or 13:2 Mbps asymmetric transmission over copper cables (<1300 metres) for use on existing local telephony networks.

The MUSIC system can be accessed using the network concept known as Fibre To The Node (FITN), using optical fibres, each serving many users, up to a cabinet near the users' homes. Thus, the cable length specification for MUSIC can be successfully limited to 1300 metres.

The MUSIC system is primarily intended for the transmission of a high (26 Mbps) bit-rate signal downstream to the subscriber and a low (2 Mbps) bit-rate signal upstream, from the subscriber.

FIG. 1 illustrates the MUSIC system. A network unit, NU, is connected to the fixed network by an optical fibre link, (FITN). A network termination, NT, connected to a multimedia application, e.g. video on demand, is linked to the NU via copper cable. The MUSIC system supports a high down stream data rate and a much lower up stream data rate.

In the MUSIC system, described herein, two fixed bit rates (13:2, 26:2 Mbps) are supported, the lower bit rate, 13:2 Mbps, can be implemented as an extra option for use with poor, or extremely long, copper cables.

For the network termination (NT), the connection consists of a set of standard interfaces, such as, POTS, ISDN, ATM25 and Ethernet. All transfer protocols are carried by the modem data stream, except for the POTS service, which is passively filtered out so that it is independent of modem status. The network unit (NU) terminates in the fixed network.

MUSIC separates the up and downlink spectra by passive filtering in the analog parts.

The version of MUSIC, described herein, is intended to allow for future functionality upgrades. For this reason, the FFT/IFFT block is designed to support full functionality so that it can be reused in future upgrades of the system.

The MUSIC system is a DMT-based, multi-carrier, VDSL system, using Discrete Fourier Transforms to create and demodulate individual carriers. This is illustrated in FIG. 2, which shows two transceivers each of which has a receiver, Rx, and a transmitter, Tx, connected to a twisted copper pair. Data is transmitted between the two transceivers using a plurality of carriers, some of which may not be used, e.g. where channel quality is extremely poor. The number of bits conveyed by each carrier may also vary, depending on channel quality.

A multi-carrier modulation technique, such as DMT, handles frequency dependent loss and noise in twisted pair-cables in an efficient manner. In the MUSIC system, the available 10 MHz bandwidth is divided into 1024 carriers each of which is 9.77 kHz wide. The allocated transmission power for the individual carriers depends on the noise power and the transmission loss in each band. Every carrier carries multilevel pulses that can represent up to 12 bits of data (4096 QAM). The individual carrier's signal-to-noise ratio (SNR) is calculated on the receiver side. If a carrier has a high SNR, up to 12 bits are placed on that carrier. For carriers with low SNR values, fewer bits are placed on the carrier. Carriers affected by narrowband interferers are turned off. Forward error correction and data interleaving is used to mitigate the effects of occasional bursts of impulse noise.

Asymmetric VDSL is implemented in this version of the MUSIC system, which means that the downstream rate is much higher than the upstream rate. Two fixed downstream rates (26/13 Mbps) are supported by the system, the chosen rate depends on the actual cable length (<1300 meters) and/or the quality of the channel. The upstream rate is fixed at 2 Mbps. Different frequency bands can be used in the MUSIC system to separate the downstream channel from upstream channel and both from POTS, see FIG. 3.

Alternatively, other duplex methods can be used, e.g. TDMA and/or a method where every other carrier is dedicated for the downstream and upstream channel.

FIG. 4 shows an overview of a MUSIC modem to which the present invention relates. The main hardware blocks are ADC and DAC, synchronization, fourier transform processing, channel estimation/equalizer, symbol mapping and detection, coding and decoding with interleaving, network interface and system controller.

The modem can be considered in terms of four principle functional blocks, namely:
the digital receiver unit;
the digital transmitter unit;
the analog front end; and
the system controller/PCI.

The analog front end includes a hybrid transformer connected to an unshielded twisted pair and POTS. On the receiver side, the hybrid is connected, via a low pass filter, LP, a programmable gain attenuator, PGA, to an analogue to digital convertor. A voltage controlled crystal oscillator, VCXO, is used to drive the analogue to digital convertor. On the transmitter side the hybrid is connected to a digital to analogue convertor via a low pass filter.

The digital receiver unit includes a fast fourier transform and resealing unit, FFT, connected, as shown in FIG. 4, to a synchronisation unit and a channel estimator. The channel estimator is connected, via a symbol detection unit and a de-interleaving an decoding unit, to a bit manipulation unit and thence to a network application interface.

The digital transmitter unit includes a bit manipulating unit connected to an inverse fast fourier transform and scaling unit, IFFT, via an encoding and interleaving unit and a symbol mapping unit.

The system control is connected to various functional units in the digital receiver and digital transmitter and to the network application interface and a computer interface, as shown in FIG. 4.

The network interface connects the higher protocol level to the modem layer one functionality. This block is responsible for providing the system with data at the configured bit rate, adding dummy frames if needed.

The data is then channel coded and interleaved. The MUSIC system, herein described, uses a convolutional code combined with interleaving. Using a depth of multiple frames, a combined frequency/time interleaving is obtained (see later in this specification).

The symbol mapping block receives the input data as an integer vector. This vector is mapped into the configured constellation depending on the current bit loading value. The mapper uses a Gray-coding scheme to reduce the probability of bit errors.

A real vector multiplication is the first step in the IFFT block. This enables the system to scale the output power level of each carrier. The IFFT block then performs a real 2048 points inverse FFT on the input data, modulating each carrier. As a final step, an address wrap around is performed on the output data, adding a copy of the first 128 samples at the end of the frame. This is called the cyclic prefix (CP).

The modulated signal passes to a DAC which converts the signal with a minimum true dynamic range of 84 dB. The DAC is clocked by the system sample clock at 20 MHz. To remove Nyquist ghosts the signal is LP filtered. The hybrid provides a balanced interface to the copper cable.

An overview of the MUSIC transmitter and receiver signal path is shown in FIG. 4. The transmitter part uses the same hybrid construction as the receiver.

At the receiver end, the splitter/hybrid transceiver separates the frequencies used by POTS, from 0 to 4 kHz, from the frequencies used by the system. It also extracts the low level receive signal from the combined high level transmit signal and the low level receive signal.

To reduce Nyquist effects on the signal the analog received signal is low-pass filtered before it is fed into the PGA (Programmable Gain Amplifier).

The PGA is necessary to make best use of the dynamic range of the ADC. In this system, the dynamic range should be at least 66 dB.

After the signal has been converted to digital format, the synchronization and the FFT block receives the data.

In the synchronization block, a frame clock (for the control of the FFT buffers) and a control signal for the VCXO is generated. Initially, the synchronization block retrieves the frame clock from the sampled signal. The frame clock is then used for calculating the frame timing estimate and is transferred to the VCXO feed back controller. The VCXO generates the sampling clock (20 MHz).

A sampling clock, controlled only by the frame time estimate, is not sufficiently accurate in a DMT system. Therefore, after the locking sequence, a dedicated pilot carrier is used to achieve a high sampling clock timing accuracy.

A BSI-signal is also extracted from the pilot carrier. BSI is the Base Synchronization Interval timing signal used to synchronize the transmitter and receiver CCH communication. One of the novel aspects of the MUSIC system is the algorithm used by the synchronization block, which is discussed in greater detail later in this specification.

A 2048 point real FFT is performed on the input frames in the FFT block. After this, rescaling is performed, based on the energy loading parameters, before the data is transferred to the next block.

The channel estimation and equalization are performed on the data output from the FFT block. All data frames are used for estimating the channel properties. These are then used to compute a bit-loading vector, determining the number of bits transmitted on each carrier. This information is subsequently sent to the transmitter through the upstream control channel (CCH).

In the symbol detection block, a demapping is performed, for each carrier, according to the bit-loading mask.

After demapping, a deinterleaving and forward error correction (FEC) decoding is performed on the detected bit-stream.

The data is then ready for the Network/Application interface block after bit manipulation. The dummy frames are removed in this block.

At the heart of the system, shown in FIG. 4, is the system controller (SC). The SC is a general purpose processor which interfaces and controls the various sub-blocks, using a local PCI bus. In the version of MUSIC herein described, the controller CPU is programmable. An external port is provided, through an on-board JTAG interface, to facilitate programming.

The main tasks of the SC is to control the system start-up and run-time behaviour and to perform bit-loading and energy loading calculations. It will communicate with the remote side of the modem through a dedicated control channel (CCH). This channel carries data relating to bit/energy loading changes and other system signalling.

Figure 5:
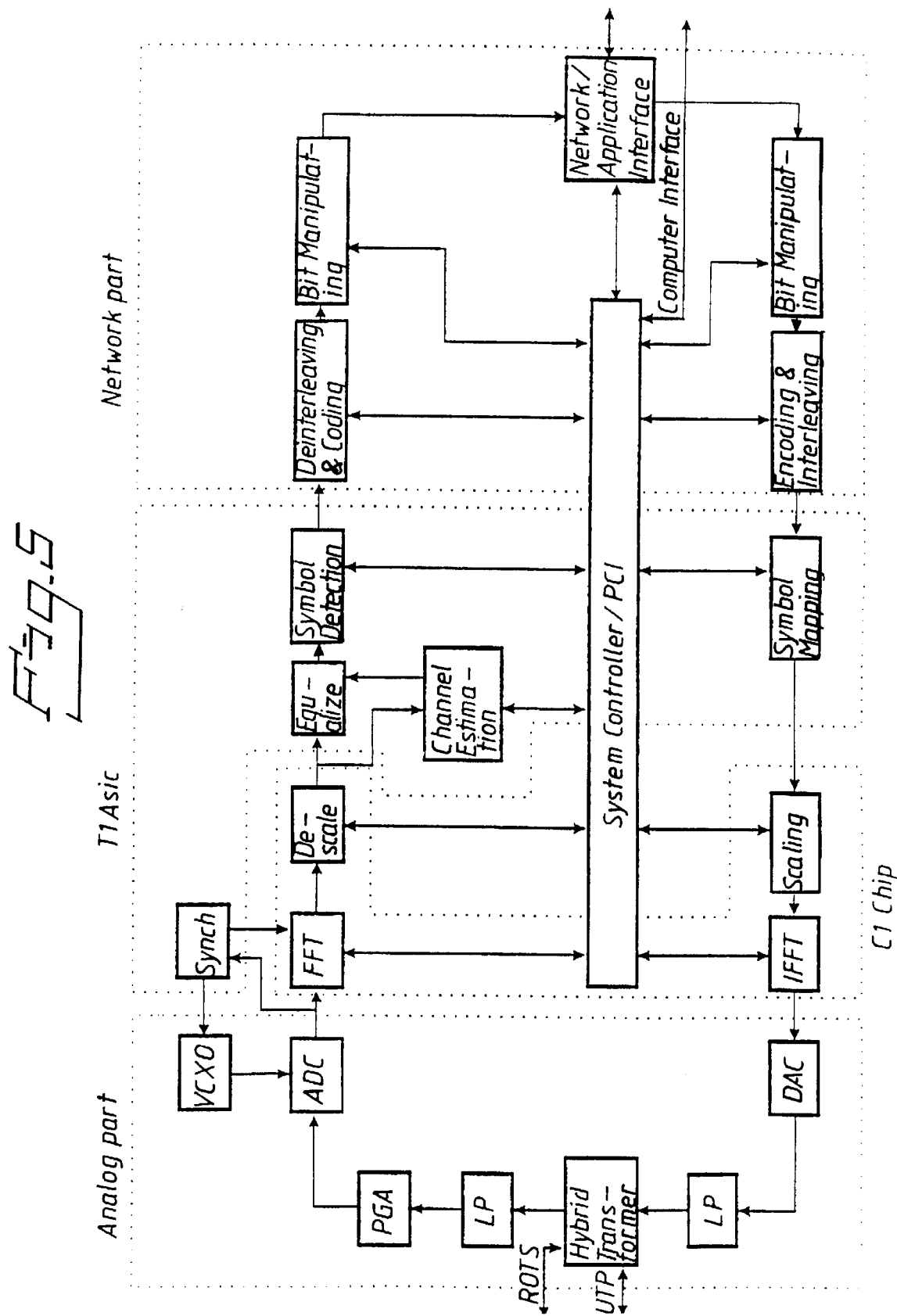
FIG. 5 illustrates, in schematic form, a partitioning of the multi-tone carrier system modem, shown in FIG. 4, used to facilitate implementation.

To obtain a cost effective product for high volume use, the digital parts of the system must be based on at least two ASIC circuits. FIG. 5 shows how the system can be partitioned for the purposes of chip design. One chip contains the FFT/IFFT kernel. A second chip contains frame synchronization, channel estimation and equalization, symbol detection and symbol mapping. The analog block and the network interface block can be implemented on third and fourth chips respectively.

The system parameters used by the MUSIC system, herein described, are set out in Tables 1 to 3, appended hereto.

Figure 6:
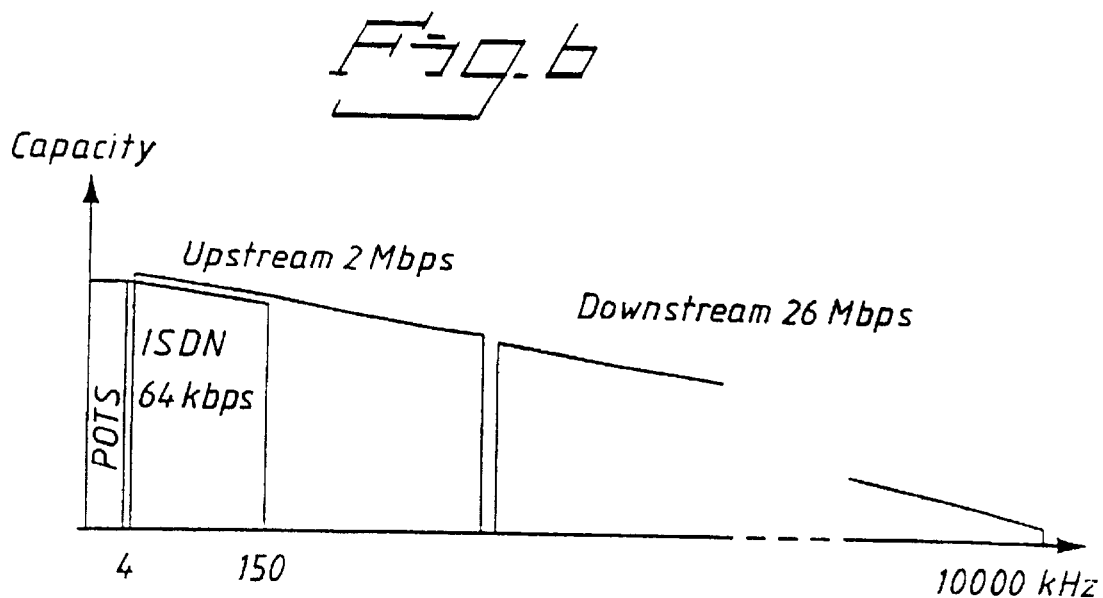
FIG. 6 illustrates, in graphical form, copper pair spectrum allocation.

VDSL systems work in the spectrum from 0 to 40 MHz. In this band the MUSIC system, herein described, occupies the lower 10 MHz, see FIG. 6. A number of traditional bands exist in this spectrum, including POTS and some radio amateur bands. Different frequency bands are used in the MUSIC system, herein described, to separate the downstream from upstream channels. As the MUSIC system, herein described, uses 1024 carriers over 10 MHz, each carrier has a bandwidth of 9.77 kHz, the first two carriers are allocated by the DC level and the POTS service. The last carrier is disabled because it is the Nyquist point. Other carriers (in radio bands) my need to be cancelled. This is primarily a question of immunity and radiation for the balanced copper pair.

By passive filtering of the POTS spectrum, this service can be made independent of the MUSIC system, herein described, run-time status, or power supply.

There are two ways to provide the ISDN service for a MUSIC modem connection. One way is to allow POTS and ISDN systems to exist below the MUSIC frequency bands. This can be achieved using a similar filtering process for the ISDN band spectrum, as for the POTS. This filtering enables the service to be provided independently of configuration.

The other way of providing ISDN, is to let ISDN be a bearer service in the MUSIC system. This solution has the advantage in terms of spectral efficiency. Using 1024 carriers over 10 MHz gives each carrier a bandwidth of 9.77 kHz. The ISDN spectrum requires the allocation of (150-4)/9.77= 5, of these carriers. Because of the channel characteristics, these five carriers must be selected to have the best SNR in the system. For a standard connection this gives 5*100=500 kbps of bandwidth.

The optimum solution is, therefore, to use the modem as a bearer, allocating only 64 kbps, compared to 500 kbps for the total bandwidth for the 64 kbps ISDN service.

The results of the measurements of attenuation and FEXT ("Far End Cross Talk"), carried out on one telecommunication operator's network, showed that it is possible to achieve bit rates higher than 100 Mbps, if the cable is shorter than 200–300 meters. For longer cables, the attenuation on higher frequencies limits the maximum bit rate. For cables around 500 meters, 40 Mbps can be achieved, and for a 1 km cable, 15–20 Mbps is realistic.

Another factor that decreases the performance is EMC, which limits the power used. Some parts of the frequency domain may also have to be excluded.

A typical PSTN can be expected to have the following impulse noise characteristics:

maximum duration 250 $\mu$s median interval 67 ms maximum peak amplitude 20 mV most of the energy below 200 kHz background noise −107 dBm/Hz The main source for timing in the system is the sample clock. The reference for the sample clock is situated on the NU side and is common to all twisted copper pairs within a secondary cable. The sample clock frequency is 20 MHz±10 ppm with a phase jitter of less than 0.5 ns.

The sample clock at the NT side is phase-locked to the NU side. The logic for the locking uses the frame timing estimation in a first stage and then uses the pilot carrier to produce a fine adjustment of the locking. The locking logic controls the frequency of a VCXO via an 18 bit digital to analogue convertor. The requirements for the VCXO are 20 MHz±25 ppm range and a 10 ppm/Volt sensitivity. The final locking should have an accuracy of 1/100 of a sample, with a phase jitter of less than 0.5 ns.

The frame clock is 1/(2048+128) of the sample clock and controls the start of receiving and transmitting frames. The frame clock, used for both transmitting and receiving, differs in phase on both the NU and the NT side.

Figure 7:
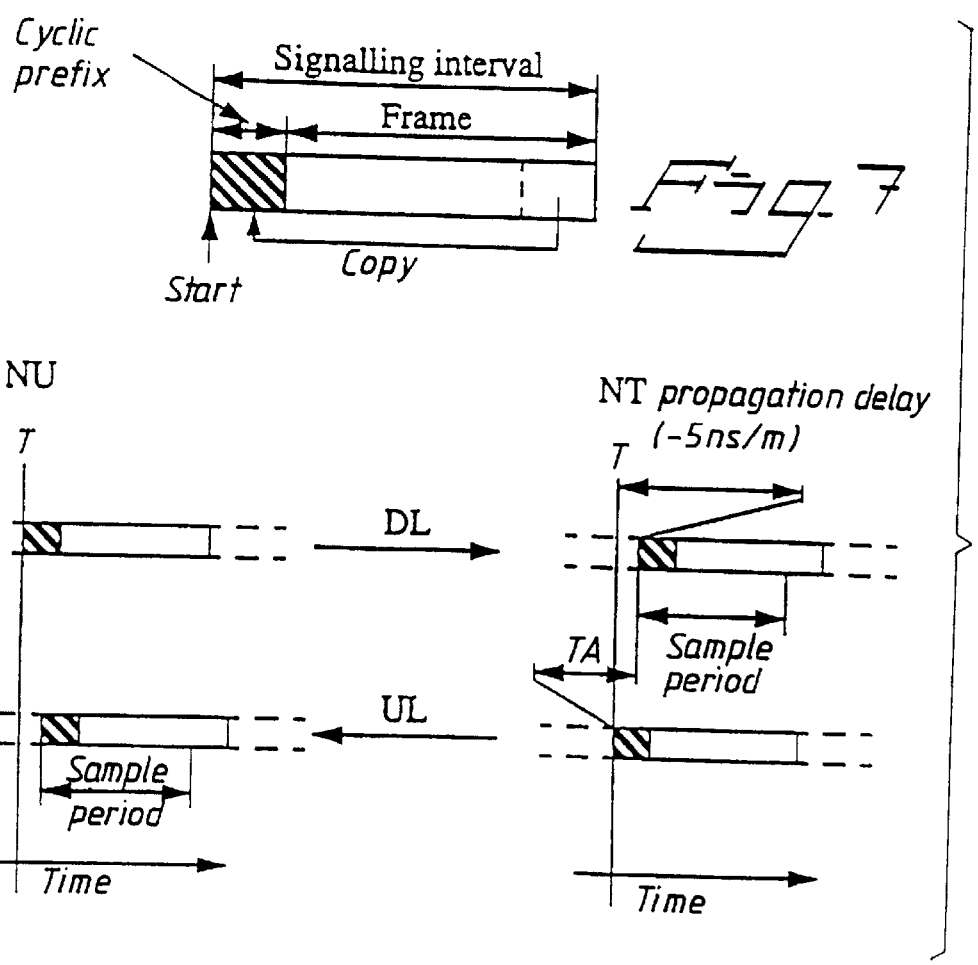
FIG. 7 illustrates, in schematic form, the frame structure used in the multi-tone carrier system described herein.

The frame clock for transmitting on the NT side is the master and controls the start of the signalling intervals, see FIG. 7.

The receive frame clock on the NT side is derived from the frame timing estimation hardware function and controls the start of frame sampling period, see FIG. 7.

The frame clock for transmitting on the NT side is the same as the frame clock for receiving, but is a TA sample "earlier" in phase. TA is a parameter measured during system start up at the NU side and used for compensation of propagation delay on the copper wire.

This has to be done in order to maintain the orthogonality, over the copper wire, for the sampled periods, on both the uplink and the downlink. The frame clock for transmitting on the NT side controls the start of the signalling intervals, see FIG. 7.

The receiving frame clock on the NU side is delayed a number of sample clock cycles (TA) relative to the frame clock for transmitting after the TA calculation is carried out. The delay before the calculation of TA in the start up sequence is determined by the frame timing estimation hardware function and the value is accessible by the system controller. The receive frame clock on the NU side controls the start of frame sampling period, see FIG. 7.

The BSI clock is used to synchronize parameter changes between the transmitting and receiving side. The parameters can, for instance, be bit loading, energy loading, or control channel frequency. The parameters are updated by the system controller, on both sides, before the BSI clock initiates the switch to the new set-up.

The BSI clock is 1/8192 of the frame clock. The BSI clock in the uplink is delayed by a half BSI clock cycle relative to the BSI clock in the downlink.

A short pseudo-random sequence on the pilot channel is used for BSI synchronization between the transmitting and receiving side.

The cyclic prefix is an extension of the frames added by the FFT chip. In order to maintain the orthogonality during the whole signalling period, the last 128 samples of the frame are copied and placed before the actual frame. This arrangement handles problems associated with intersymbol interference caused by time dispersion.

It is important that, the part of the signalling period sampled on the receiving side only, overlaps one signalling period in the other direction, along the entire copper wire. TA is used to optimize this overlap period. The maximum cable length is limited by TA=128 samples=6.4 μs propagation delay. This corresponds to 1280 meter (if propagation delay is 5 ns/m).

The analog interface connects the received and transmitted digital data stream at the C1 chip with the telephone line. There are also connections to the T1 chip and the system controller for control purposes.

The analog interface is illustrated in FIG. 8. The line is connected to a hybrid transformer, which is also linked to the POTS. On the receive side of the hybrid, the incoming signal is passed via a low pass filter and programable gain attenuator to an analogue to digital convertor, ADC, and thence to the C1 chip. On the transmit side of the hybrid, the outgoing digital signal is converted to analogue for by, digital to analogue convertor, DAC and thence passed via low pass filter LP to the hybrid transformer. A voltage controlled crystal oscillator, which drives both ADC and DAC, is connected to the synchronization block of the T1 chip.

An OFDM-frame is a sum of sinusoidal carriers modulated in phase and amplitude and spaced in the frequency domain with a minimum distance of separation between carriers. The assumption that the symbols within the frame are equally distributed and uncorrelated with each other, yields a time domain signal with an approximately normally distributed instantaneous amplitude. Thus, a small possibility exists that input data can cooperatively interact to create pulses with very large peak levels. However, the maximum amplitude must be limited to a lower amplitude than this so that there exist a sufficient number of quantization levels, in the DAC, to handle average signals.

Even if the DAC has enough resolution to accommodate a high peak level in the transmitter, there are limitations on the receiver side (ADC). However, the implications on the receiver side may not be as severe as they seem.

A short cable has less attenuation in the high frequency range than a long cable, see FIG. 9. This means that an occasional pulse may appear in the receiver almost unmodified by the cable characteristics. Hence, a relatively large dynamic range is required in the receiver. However, this can be readily achieved since almost uniform attenuations do not require a large dynamic range. The ADC needs to accommodate the region indicated in FIG. 9 by the heavy solid arrowed line.

The larger high frequency attenuation of long cables does, however, require a large dynamic range. The high frequency attenuation also means that it would take several large peaks from the transmitter in order to build up high amplitudes in the receiver, a case which is even less likely to occur at the ADC input than single peaks. The headroom can, therefore, be decreased and the ADC should accommodate the region indicated by the heavy dashed arrowed line, in FIG. 9.

To summarize, the performance can be optimized by carefully setting the signal level at the receiver ADC in dependence on cable length. Cutting, i.e. high amplitude saturation of the analogue to digital convertor may still be a problem. The present invention, which is particularised below, provides a way of reducing the adverse effects of cutting.

The method of the present invention is based on the detection of samples in which the amplitude exceeds the maximum value of the quantization available. When this occurs the digital signal representing the sample is converted into a number which corresponds to a predicted value for the signal amplitude instead of the saturation value for the digital to analogue convertor employed.

The method requires only a slight increase in the complexity of the digital to analogue processing of the signal.

The method of the present invention thus reduces the adverse affects of cutting in the reception and digitization of multi-carrier signals. The present invention can be used in DMT systems, such as the MUSIC system herein described. The invention can, however, be used in radio transmission systems employing OFDM. The invention is not limited to systems employing FFT, it is also applicable to systems using wavelet transforms.

In the sampling and quantization of a multi-carrier signal, a high dynamic range is needed to avoid cutting of the digitised signal through saturation of the analogue to digital convertor used to digitise the signal. This problem arises because multi-carrier signals have an amplitude distribution which is approximately Gaussian, i.e. a normal distribution. This means that extreme values of the amplitude, high signal amplitudes, can occur, although with low probability.

The present invention is based on the registration, or detection, of extremal values of amplitude, both positive and negative, during the sampling process, and using this data to predict an expected value of the amplitude. When cutting does not occur, the digitised output of the analogue to digital convertor is used without modification. When cutting is present, the saturation value obtained from the digital to analogue convertor is replaced by a predicted value for the input amplitude. The predicted value for the amplitude may be calculated from the Gaussian distribution.

Figure 33:
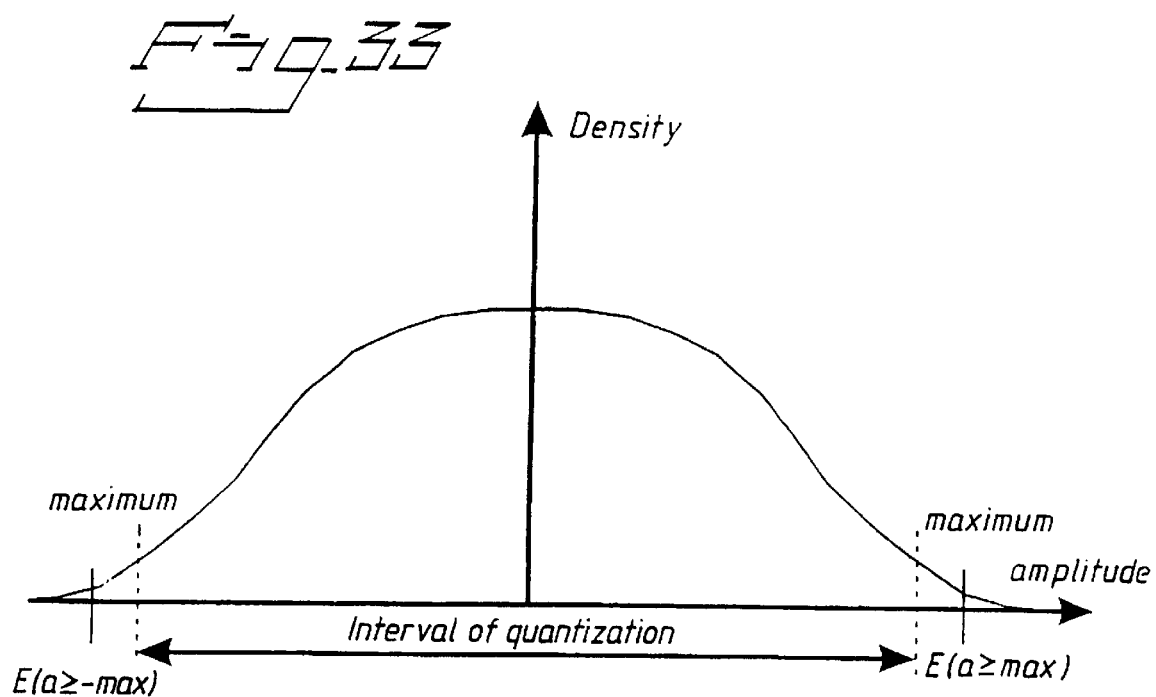
FIG. 33 shows the Gaussian distribution of the amplitude of a multi-carrier signal.

As explained above, in a multi-carrier transmission system, many narrow band data modulated carriers are transmitted in parallel via a wide band channel. If the transmitted data can be statistically regarded as a random sequence, each carrier wave will have a random phase and, in many cases, a random amplitude. The theorem of the central limit value implies that the amplitude distribution will be Gaussian, see FIG. 33, for the sum of all the carrier waves.

Figure 34:
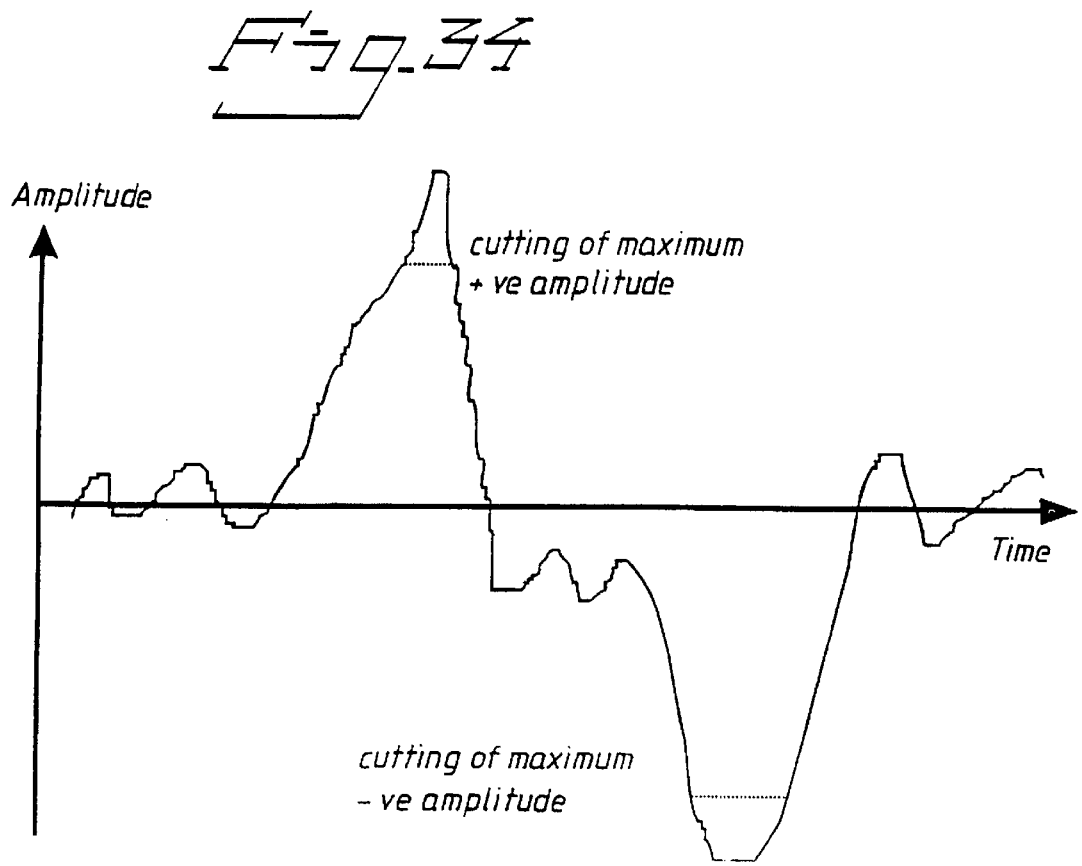
FIG. 34 shows, in diagrammatic form, the effects of cutting on a multi-carrier signal.

In order to digitise, by sampling and quantization, and recreate a multi-carrier signal without cutting, a quantizer with a dynamic resolution of many bits is needed. However, available digital to analogue convertors only have a limited bit resolution at high signal bandwidths, i.e. high sampling rates. This means that a balance must be achieved between cutting and dynamic range, or resolution. If the quantization interval is made wide enough to substantially reduce cutting, excessive quantization noise is introduced, causing an unacceptable loss of precision and performance. The effect of cutting on a signal is illustrated in FIG. 34.

The present invention is based on the following method steps:
1. The amplitude of the analogue signal is regulated by a gain controller, see FIG. 35, to a desired quantization range.
2. The quantizer, i.e. analogue to digital convertor, ADC, having a limited bit resolution, samples the signal. When the amplitude of the analogue signal exceeds the saturation value of the quantizer, either positive, or negative, the subsequent digital representation corresponds to the saturation value.
3. An extremal detector detects when the ADC saturates and, as a consequence, cutting occurs. The extremal detector controls the operation of a 3-to-1 multiplexor.
4. The quantized digital signal forms the input to the 3-to-1 multiplexor and the output signal is transmitted to down stream units in the receiver, namely the FFT processor. Depending on the control signal generated by the extremal detector, one of the following steps is effected, sample-by-sample:
   when a positive maximum is detected, a predicted maximum amplitude, a, is generated which exceeds the saturation value of the ADC, i.e. $E\{a \geq max\}$;
   when a negative maximum is detected, a predicted maximum amplitude, a, is generated which exceeds the saturation value of the ADC, i.e. $E\{a \leq -max\}$; and
   when neither a positive, or negative maximum is detected, the quantized signal appearing at the output of the ADC is used.

After the multiplexor, the number of bits is increased and these are used in subsequent digital processing of the signal.

The expansion in the number of bits depends on the predicted value of the signal amplitude exceeding the quantization interval.

Figure 35:
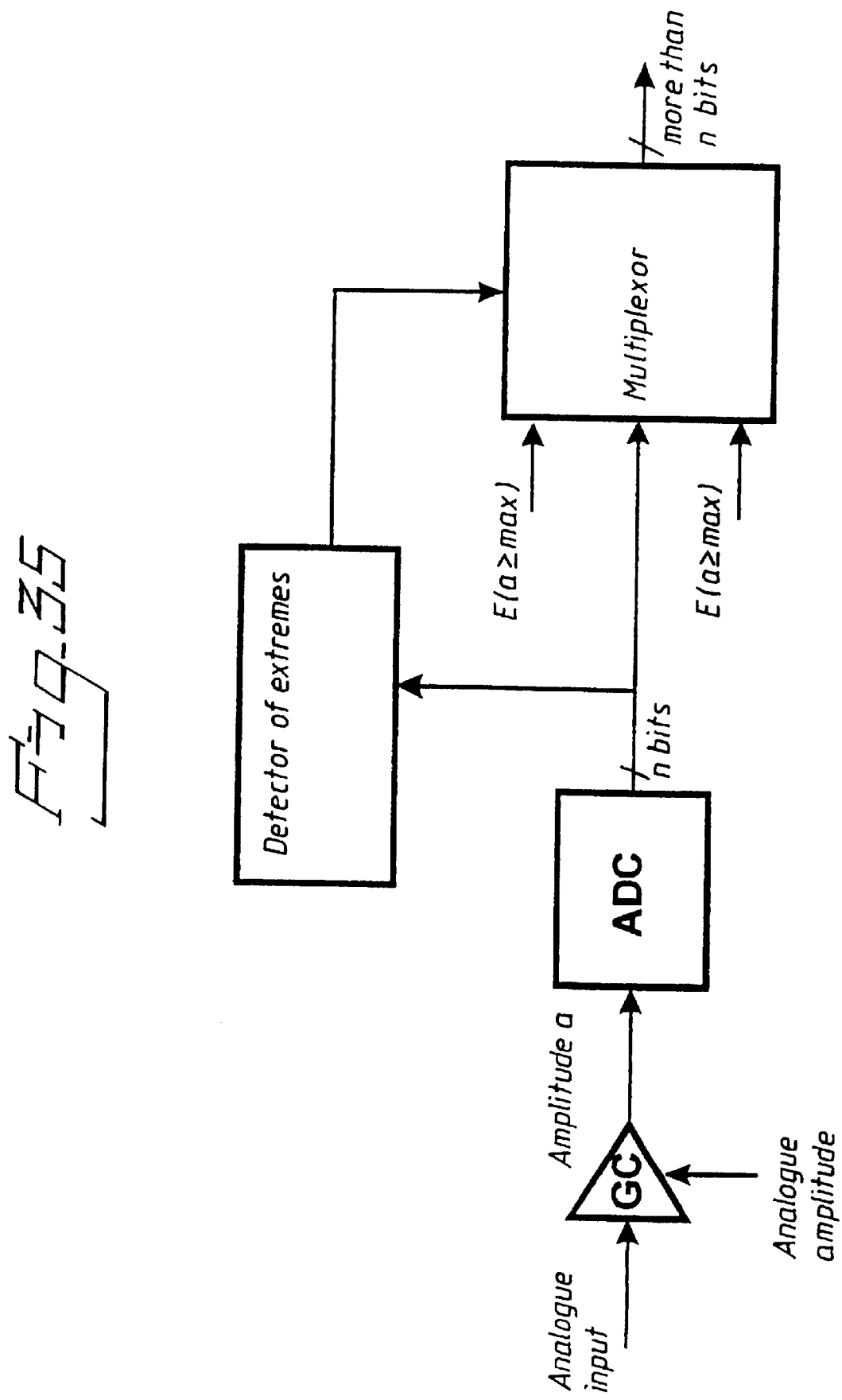
FIG. 35 illustrates, in schematic form, analogue to digital conversion circuitry employed by the present invention.

Circuitry for implementing the present invention is illustrated schematically in FIG. 35. An incoming analogue signal is passed to a gain controller, GC, which can be used to regulate the amplitude of the signal to a range suitable for processing by the analogue to digital convertor ADC. The output from the ADC comprises n bits. An extremal detector, described in FIG. 35 as a detector of extremes, detects when the dynamic range of the ADC is exceeded, i.e. when n bits is insufficient to represent the signals amplitude, and generates a signal which is fed to the multiplexor. If the positive saturation maximum of ADC is exceeded, a predicted amplitude $E\{a \geq max\}$ is switched by the multiplexor in place of the saturation value of the amplitude. If the negative saturation maximum of ADC is exceeded, a predicted amplitude $E\{a \leq -max\}$ is switched by the multiplexor in place of the saturation value of the amplitude. The number of bits representing a sample at the output of the multiplexor exceeds the number of bits n generated by ADC.

The splitter/hybrid has two major tasks, namely to:
split and combine telephone signals (POTS) and VDSL signal frequency bands; and
prevent the transmitted signal from appearing at the receiver on the same unit by balancing the cable.

Since each transmission direction has its own frequency band, it is possible to optimize both sides for their respective frequency bands to increase overall performance.

The purpose of the low-pass filter on the input signal is to reduce aliasing effects on interference above the used frequency range. The output low-pass filter reduces emitted power in the stopband. These filters may be part of the splitter/hybrid module.

The best commercially available ADC today is the Analog Devices AD9042 which has a signal-to-noise ratio of approximately 66dB. It is recommended that either this ADC, or one with equal performance, is used.

For the purposes of this description it is assumed that a 14 bit resolution DAC is used.

The FFT and IFFT algorithms are built from 1024-points complex FFTs with data reorganization to allow calculation of two real sequences at the same time. Hence, the FFT and IFFT are effectively 2048 points each. The hardware realization is based on a radix-32 kernel which calculates the result in three passes, see FIG. 10.

The relationship between signal-to-noise ratio and resolution in the algorithm can be expressed as:

$$SNR = 2^{2b-v-1}$$

with b=number of bits and v=11 (number of effective radix-2 passes). Solving for b yields 17 bits resolution (based on ADC SNR), but since the ADC is not the only source of analog signal degradation, 16 bits resolution in the algorithm should be adequate in order to maintain the resolution throughout the system.

The VCXO generates the sampling frequency used in the NT part of the system. The control voltage is based on data from the synchronization unit. The clock frequency has to be very stable and phase locked to the NU reference clock in order to preserve orthogonality between symbols.

In order to make full use of the ADC dynamic range, a programmable attenuator has to be inserted before the ADC. The attenuation level is mainly a function of the cable length and can be determined from the timing advance value by the system controller.

Attenuator resolution and range, and the relationship between the timing advance value and attenuation level, have to be determined. Equalization and variance values may also be used in the calculations for enhanced result.

In a DMT system a very accurate synchronization between the transmitter and the receiver is necessary, especially when carriers are modulated with large constellations. In the embodiment herein described, a new frame synchronization method that relies on correlation properties inherent in the received signal structure, is used.

On the NU side, a fixed frequency crystal oscillator is used as a reference for generating the sampling clock. On the NT side a sampling clock is generated by a VCXO (Voltage Controlled Crystal Oscillator), which is phase-locked to the oscillator on the NU side. The VCXO is initially controlled by the frame timing estimate. The resolution of the frame timing estimate is, however, not sufficient in the present application. Therefore, after a lock-in sequence, a dedicated pilot carrier is used to achieve a very high sampling clock timing accuracy.

Due to the long symbol duration in a DMT system, intersymbol interference caused by the channel time dispersion, can be eliminated by using a guard interval as a prefix to every frame in the time domain. In order to maintain the orthogonality of the frames, the content of each prefix is a copy of the last part of the following frame, making the frames seem partially cyclic.

Figure 11:
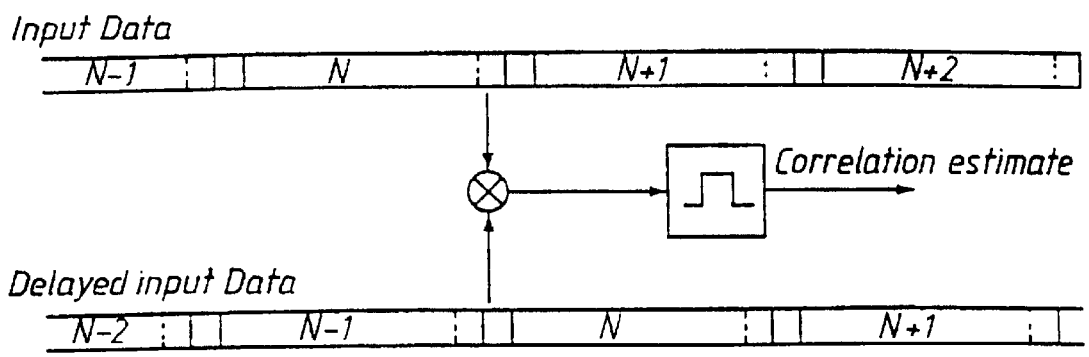
FIG. 11 illustrates, in schematic form, the frame correlation principle used in the multi-tone carrier system modem, shown in FIG. 4.

The synchronization method used for estimating the frame timing, employs the high correlation that exists between a prefix and the corresponding part of a frame. By continuously correlating samples of the received signal, separated in time by the (known) frame length, the passage of a guard interval will cause a peak in the correlation estimate. Therefore, these peaks will have a known timing relation to the frames and can be used to create a frame start signal. The principle is illustrated in FIG. 11.

The correlator and the peak time estimator use a system clock generated by a VCXO. This clock is divided by the total number of samples in a signalling interval, (a cyclic prefix and a frame), to create a signal with the same period as the correlation peaks. The phase difference, (frame time deviation), between these two signals is used as an input to a feed-back controller that adjusts the VCXO frequency to the correct sampling frequency. The phase of this sampling clock is, however, not accurate enough to be used in a DMT system. Therefore, the frame timing estimation is primarily used for a lock-in operation. It is also used for monitoring the frame timing to detect major deviations that will make a resynchronization necessary.

The correlation of the received data is calculated continuously. The time difference between the two signals is achieved by using a digital delay line of one frame length. The output of the delay line is multiplied by the non-delayed signal and integrated (accumulated) over an interval equal to the length of the cyclic prefix. The output of the integrator is the estimate of the correlation function.

Since only the timing information of the correlation estimate is used, a simplified estimator is implemented, using only the sign of the input data. This hardware implementation has a greatly reduced complexity compared to using the full sample word length.

Computer simulations have shown that using synchronous averaging of several signalling intervals reduces the variance of the frame timing estimate. Due to the reduced data word length used in the multiplier part of the correlator, it is feasible to implement such an averaging function immediately following the multiplier.

Figure 12:
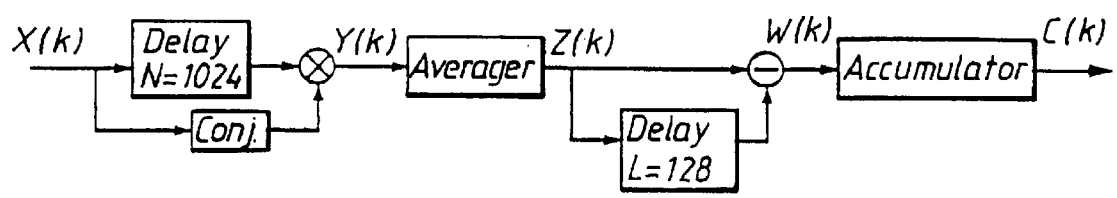
FIG. 12 illustrates, in schematic form, implementation of a correlator for use with the multi-tone carrier system modem, shown in FIG. 4.

A block diagram showing the implementation of the correlator is shown in FIG. 12. The incoming signal X(k) is past through a delay with N=1024, i.e. one frame, and to a conjugator. The output from the delay and conjugator are then multiplied to produce a signal Y(k) which is passed to an averager. The output of the averager, Z(k) is past to a subtractor from which Z(k) delayed by L=128 is subtracted. This yields signal W(k) which is passed to an accumulator yielding an output signal C(k).

Figure 13:
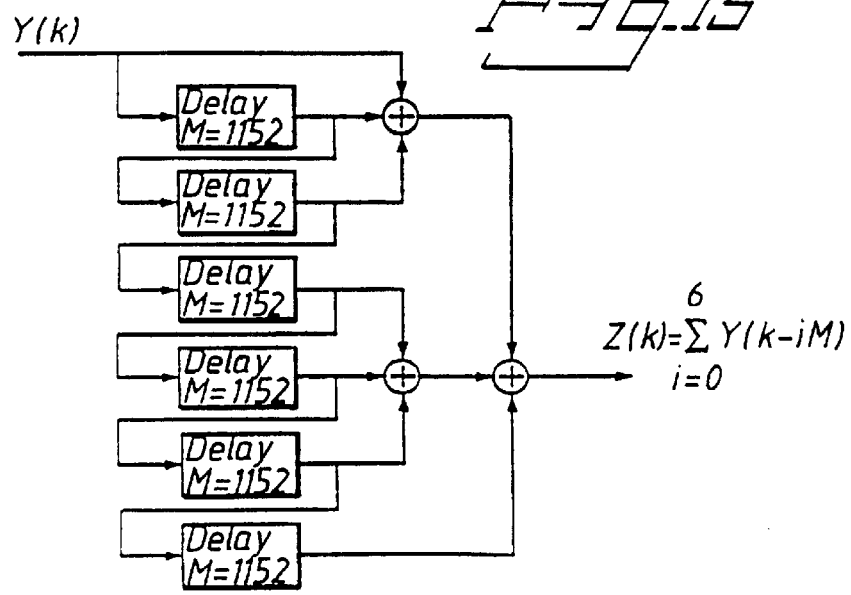
FIG. 13 illustrates, in schematic form, the averager used in the correlator of FIG. 12.

The details of the averaging part of the correlator are shown in FIG. 13. The averager comprises a series of delay elements combined with adders, as shown. The output signal can be expressed as:

$$Z(k) = \sum_{i=0}^{6} Y(k - iM)$$

where Y(k) is the input signal and Z(k) is the output signal.

In order to make the averaging synchronous to the frame structure of the signal, the delays equal the signalling interval.

Figure 14:
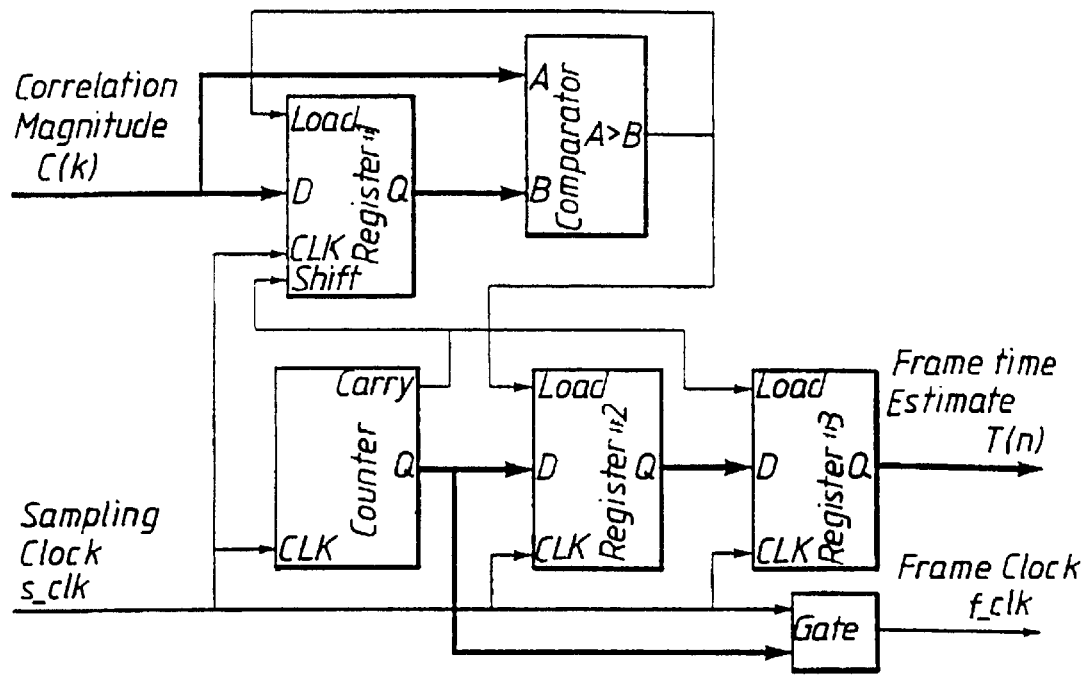
FIG. 14 illustrates, in schematic form, a correlation position detector for use with the multi-tone carrier system modem, shown in FIG. 4.

A detector for finding the position of the maximum magnitude of the correlation function estimate is shown in FIG. 14. It is implemented using a register (#1) for the most recent maximum value and a comparator. The register content and the correlation magnitude are compared, and every time a value larger than the register content is encountered, the new value is stored in the register. The present value of a counter, counting sampling intervals (modulo the signalling interval), is also put into a second register (#2). When a whole signalling interval has passed, this second register will contain an index to the maximum value found during that interval. This index is stored in a third register (#3), once per signalling interval, and the content of the first register (#1) is divided by two (using shift).

The index stored in register #3 is interpreted as the deviation between the counter value and the actual timing of the input signal frames. The feed-back controller will make the average of this deviation converge towards zero. The counter value can then be used as a pointer into the signalling interval. The frame timing clock is generated using this counter value to indicate the frame start.

The estimation of the pilot carrier frequency domain complex representation is performed using the FFT unit available in the system. The advantage of using this method is that the estimate will be independent of the varying modulation of the other carriers. This is due to the inherent orthogonality between the carriers. In order to achieve an estimate with acceptably low variance, some averaging is necessary. This is done using first-order digital IIR filters.

Unfortunately, the estimate is represented as a complex number in rectangular coordinates so the argument is not directly available. In the feed-back loop it is necessary to detect very small argument deviations. Therefore, the resolution of the argument must be high.

The feed-back controller will make the pilot carrier argument converge towards zero. An approximation of the argument, that is linear only in a small range around zero, is then sufficient to achieve acceptable performance. A useful approximation that is monotonic in almost all four quadrants and also easy to implement in digital logic is described by the expression:

$$A = M \cdot [\Im\{C\} - (1 - sgn\Re\{C\}) \cdot K \cdot \Re\{C\} \cdot sgn\Im\{C\}]$$

where C is the complex pilot carrier estimate, M is a positive scaling constant and K is a positive constant that affects the shape of the function (K=2 is used here).

The channel introduces phase-shift on the pilot carrier that might cause misalignment between the input signal frame timing and the pilot argument zero. In order to eliminate this problem, the pilot carrier estimate is also passed through the frequency domain equalizer. The equalizer parameter for this carrier is set during the start-up sequence, when the frame timing estimate has converged to its final value.

The selection of pilot carrier will be fixed, but logic for selecting other carriers as pilot can also be provided.

The feed-back loop actually has two controllers, each with its own input signal. The two controller outputs are added and fed via a D/A-converter to the VCXO that generates the sampling clock. Both controllers are of the PI type (Proportional and Integrating).

Figure 15:
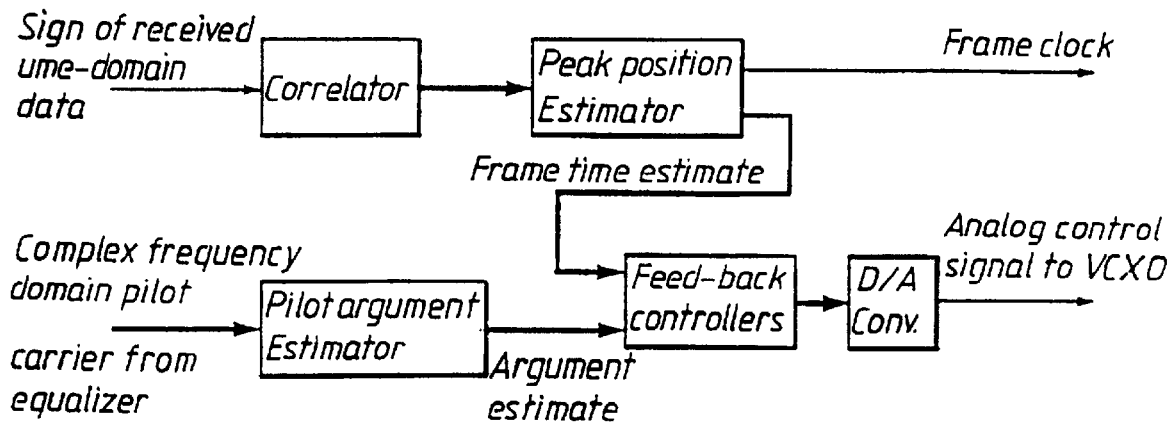
FIG. 15 illustrates, in schematic form, an overview of the synchronization unit employed in the multi-tone carrier system modem, shown in FIG. 4.

FIG. 15 gives an overview of the signal paths. The received time domain data passes through the correlator and peak position estimator to yield the frame clock. The complex frequency domain pilot carrier derived from the equalizer is passed to a pilot argument estimator, the output of which is past to feedback controllers which also receive an output from the peak estimator. The output from the feedback controllers is then passed to a digital to analogue convertor to yield a signal used to control the VCXO.

During the start-up sequence, only the frame timing controller is active. When the frame timing has stabilized, the equalization parameter for the pilot carrier is calculated and set (by the SC). This is done only once and further updating of this parameter is inhibited. After this change of equalization parameter, the averager for the argument estimate is given sufficient settling time. Finally, the frame timing controller is stopped and the pilot argument controller is activated. When the frame timing controller is stopped, its last output value is locked so the VCXO frequency remains close to its final value.

The pilot carrier is also used for the transmission of the Base Synchronization Interval (BSI) timing information. The carrier argument is normally supposed to be constant. A short pattern is BPSK-modulated onto the carrier, using phases 0 and π and leaving the carrier at phase 0 during the rest of the BSI interval. If this pattern is only a small fraction (<1%) of the BSI interval, the disturbance of the pilot carrier argument estimation is negligible. A correlator is used for detecting the pattern and give the timing signal for BSI.

The system controller (SC) must have read access, for synchronization lock detection and monitoring reasons, to registers holding the frame time deviation estimate and the pilot argument approximation.

In order to handle the initial equalization of the pilot carrier, it is necessary for the SC to read the averaged pilot carrier complex representation and write to the equalization parameter memory.

An offset register for determining the relative timing between the input data frames and the frame start signal is necessary and must be writable by the SC. This is used on the NT side.

The detected BSI event signals, for both receive and transmit, should be connected to the SC as interrupt inputs.

Alternatively, the pilot carrier can be recovered from the time-domain signal, using a bandpass filter, and directly used for phase-locking of a sampling clock oscillator. The frequency-domain method, described here, has the advantage that the pilot carrier estimate is independent of the modulation of the other carriers due to the orthogonality. A different frame synchronization method would be dependent on including a known pattern in some frames. This would reduce the system capacity.

The frame and cyclic prefix lengths are fixed in the embodiment herein described. The method, as described above, is designed to work in a feed-back loop with a VCXO. In a unit using a fixed sampling clock oscillator, the frame timing estimator design needs to be slightly modified. It is important that the VCXO has very low phase noise, since the feed-back loop is too slow to compensate such a disturbance.

A discrete multi-tone (DMT) system modulates N complex data symbols onto N carriers (here we use N=1024 carriers). This mapping is computed as an inverse discrete Fourier transform by using the Inverse Fast Fourier Transform (IFFT). In the receiver the N carriers are demodulated by a FFT.

Figure 16:
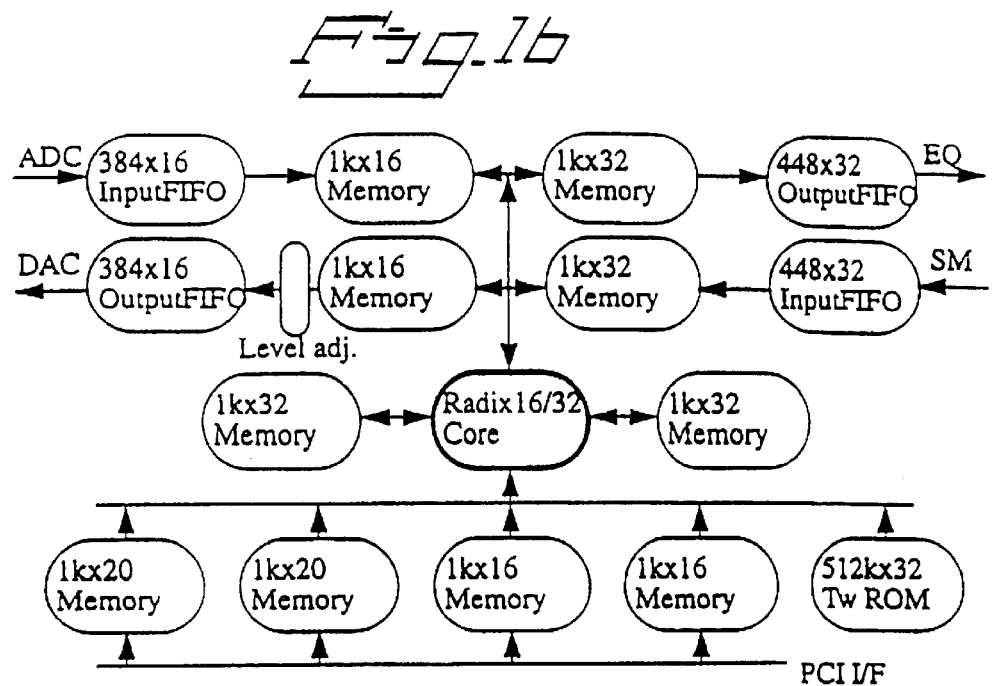
FIG. 16 illustrates, in schematic form, an overview of the FFT/IFFT unit employed in the multi-tone carrier system modem, shown in FIG. 4.

In the modem, herein described, the FFT and IFFT is carried out by the same unit, using the same radix 16, or 32 core, in different phases. This process is illustrated schematically in FIG. 16.

The main operation is divided into frames of length 2048 real, or 1024 complex values. For each frame this unit performs a FFT, IFFT, Scaling, Descaling, and addition of Cyclic Prefix.

The FFT and IFFT calculate 2048 point real FFTs and operate with a minimum of 16 bit arithmetic.

For the network terminal side, (NT), there is a requirement on synchronization between the input frame start and the IFFT output start. (A synchronization between the upstream and downstream carriers). The transmitter should be able to start sending a frame before it starts receiving a frame, so called timing advance.

A scaling should be provided before the IFFT This scaling is a multiplication between the real coefficients stored in this unit and the input values from the symbol mapper (SM). The coefficients are 16 bits each.

The coefficient memory consists of two banks of equal size (16×1024 bit). One bank is in use while the other is updated. Switching is enabled through a PCI command and is executed at the next BSI.

After the FFT, a resealing should be performed before transferring the data for equalization and symbol detection. This descaling is a multiplication by the inverse of the scaling values. The coefficients are represented by 16 bits.

An exponent (resulting in a post shift) of 4 bits might also be needed to maintain the precision.

The coefficient memory consists of two banks of equal size ((16+4)×1024 bit). One bank is in use while the other is updated. Switching is enabled through a PCI command and is executed at the next BSI.

Figure 17:
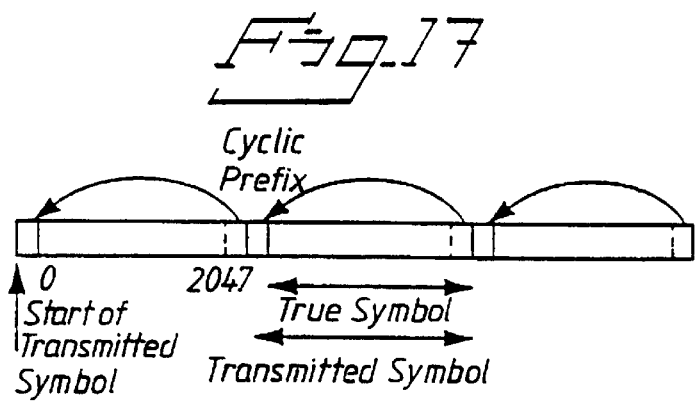
FIG. 17 illustrates, in schematic form, the use of a cyclic prefix.

At the beginning of each frame a cyclic prefix is added. This process is illustrated schematically in FIG. 17. The insertion of a cyclic prefix avoids inter-symbol interference (ISI) and preserves the orthogonality between the tones, resulting in a simple input-output relation which makes it possible to view each carrier as a separate channel. This cyclic prefix consists of a repetition of the last part of the frame.

Given that timing advance is used and the maximum cable length is 1300m, a cyclic prefix of 128 samples will be needed. Thus, the output for each frame should be sample:
 1920, 1921, . . . , 2046, 2047, 0, 1, 2, . . . , 2046, 2047.

For each of the above component, there is a FIFO to interface the external world with the FFT/IFFT input and output memories. Thus, in total there are 4 FIFOs.

It is recommended that the FIFOs interfacing the analog side have a size of 384 words (16 bits) and the FIFOs interfacing the T1 chip have a size of 448 words (32 bits).

Another DMT technique that does not use Fourier transforms is Discrete Wavelet Multi-tone Transform (DWMT). This method has been proposed to the ADSL standardization committee, which turned it down.

The precision needed in this technique depends on the required dynamic range, which in turn, is decided by the analog components (esp. DAC). The FIFO size will depend on clock speed differences and the amount of timing advance used. The use of clipping is a trade off between dynamic range (quantization noise) and clipping noise.

Channel estimation is performed using a decision directed method, since all data frames are then used for updating the channel model. Known data frames are necessary only at start-up. Under certain conditions, the interference on the channel can be estimated using all data frames. This is important for early detection of changes in the channel transmission quality.

The basic principle for decision directed estimation is that differences between received data and known transmitted data are used for updating a channel model. At a certain stage of this process, the channel model is accurate enough to be used for equalization of the received data and the detector will produce correct data. This output data can then be used in the same way as the known data for further updating of the channel model. Therefore, the predefined data frames are no longer necessary and random data transmitted through the channel is used instead.

Figure 18:
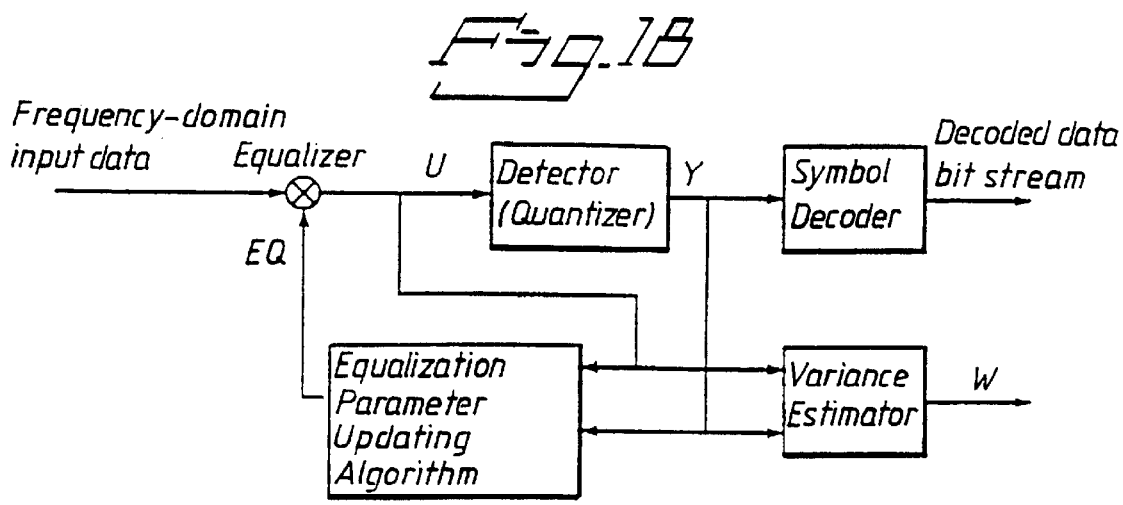
FIG. 18 illustrates, in schematic form, a decision directed channel estimation and equalisation system for use in the multi-tone carrier system modem, shown in FIG. 4.

By using data taken after the equalizer as one input and data after the detector as the other input, an adaptive updating algorithm can be designed. It modifies the equalization parameters in small steps in such directions that the equalizer converges towards a model of the channel inverse. FIG. 18 shows a block diagram of such a system. Frequency domain input data enters the equaliser and is multiplied by the output of an equalisation parameter updating unit, EQ. The resultant signal, U, is passed to a detector (quantizer) whose output is Y. Y is then passed to a symbol decoder which produces a decoded data bit stream. U and Y are also passed to an input of the equalization parameter updating unit and to a variance estimator. The output of the variance estimator is W.

An adaptive algorithm for estimating the equalizer parameters (EQ), using the equalized data (U) and the quantized data (Y) as inputs, is described by the following equation:

$$EQ_{k+1} = EQ_k + \frac{\mu}{|U_k|^2} \cdot EQ_k \cdot U_k^* \cdot (Y_k - U_k)$$

where $\mu$, is a positive constant ($\mu \ll 1$) that affects the adaption dynamics. A smaller value gives a slower adaption than a larger value, but it also gives a better robustness when there are disturbances on the input signals.

For implementation reasons, the division, shown in the equation, should be avoided. The expression $\mu/|U_k|^2$ has a too large dynamic range to be replaced by a constant. It is possible, though, to quantize this expression in a logarithmic fashion as shown below:

$$\frac{\mu}{|U_k|^2} \approx 2^{integer(2 \cdot \log_2 |U_k|) + integer(\log_2 \mu)}$$

The exponent of the above expression can be produced using the absolute value of $U_k$ as the input of a binary priority encoder and negating the output. Since the expression is an integer power of two, the multiplication operation in the algorithm is implemented using a barrel shifter.

The variance of the interference on each of the carriers is estimated using the standard method of integrating the squared deviations from a mean. In this case each quantized value, Y, is used as the mean for the range of data values, U, that are quantized to this Y. This method assumes that the symbol error rate is low enough for each data value to be associated with the correct mean. However, if suitable constellations are selected for the different carriers, this condition is fulfilled.

FIG. 18 shows the variance estimator as a part of the system. The algorithm used for the estimation is described by the following equation:

$$W_{k+1} = (1-\epsilon) \cdot W_k + \epsilon \cdot |Y_k - u_k|^2$$

The integration is here replaced by an exponentially weighted averaging filter. The parameter $\epsilon$ is a small positive constant ($\epsilon \ll 1$) that affects the dynamic properties of the filter. This is not a critical parameter and selecting an $\epsilon$ among integer powers of two will be sufficient.

If a value of $\epsilon$ is selected that gives a good variance estimate, the algorithm will not be able to detect sudden changes in the interference level. Therefore, a separate algorithm, working in parallel with the variance estimator, may be necessary for this task.

The system controller must have both read. and write access to the memory holding the equalization parameters. Initialization of the parameters is necessary at start-up. Monitoring the parameters is also necessary to detect when they have adapted close enough to their final values.

The channel variance memory must be available for system controller read operations. Initialization of this memory to all zeroes can be connected to a system reset.

The parameters affecting the dynamics of the estimators must be accessible for write from the system controller.

The method, herein described, assumes a specific start-up sequence, both for the channel and the interference estimation. During normal execution it is dependent on a suitable selection of bit-loading, giving low enough symbol error rate.

It is important that the equalization parameters are initialized to unity value at the beginning of the start-up sequence, since the input data to the updating algorithm passes through the equalizer. The updating algorithm is sensitive to scale changes in the data path.

Any change of scaling in the transmitter must be compensated in the receiver. This also calls for special care in the use of the analog input gain control in the receiver.

Figure 19:
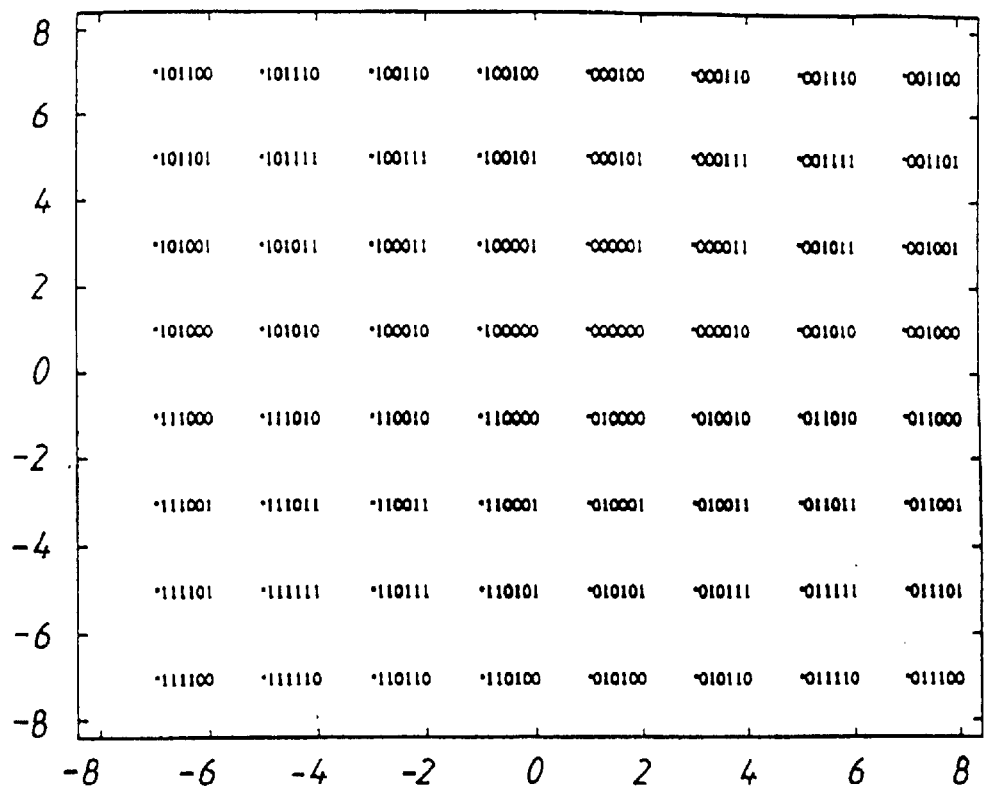
FIG. 19 illustrates, QAM encoding for b=6.

The symbol mapper, (encoder), maps a number of bits into a complex number (I, Q) which indirectly determines the phase and amplitude of a carrier. The mapping of all values of a certain bit length is called a constellation, and is illustrated in FIG. 19. The detection is the inverse function, that is, from a complex value, determining the value of the bits transmitted on the carrier. The number of bits sent on a certain carrier is determined by the bit-loading factor for that carrier.

The construction of a specific constellation is aimed at letting each point be as far removed, as possible, from all the other points. At the same time the average energy should be as low as possible. Another constraint is that the mapping and detection unit should be as simple as possible. The decision as to which constellation is to be used will, however, influence not only the symbol mapping and detection units, but also the bit loading and possibly the adaptive equalizer.

For a given carrier, the encoder selects an odd-integer point (I, Q) from the square-grid constellation based on the b bits ($v_{b-1}$, $v_{b-2}$, . . . , $v_1$, $v_2$). For convenience of description, these b bits are identified with an integer label whose binary representation is ($v_{b-1}$, $v_{b-2}$, . . . , $v_1$, $v_2$). For example, for b=2, the four constellation points are labelled 0, 1, 2, 3 corresponding to ($v_1$, $v_2$)=(0,0), (0,1), (1,0), (1,1), respectively.

For even values of b, the integer values I and Q of the constellation point (I, Q) are determined from the b bits ($v_{b-1}$, $v_{b-2}$, . . . , $v_1$, $v_2$) as follows. Split V into VI=($v_{b-1}$, $v_{b-3}$, . . . , $v_1$) and VQ=($v_{b-2}$, $v_{b-4}$, . . . , $v_0$). apply the inverse Gray code to V1 and VQ. This yields I and Q as I=2Gray' (VI)+1 and Q=2Gray' (VQ)+1.

FIG. 19. shows how the binary pattern of V maps onto I and Q given b=6.

Before these values are sent to the IFFT they are normalized by shifting them so that the msb of these numbers become the msb of the output (16-⌈b/2⌉ steps left).

For a given carrier, the decoder uses a constellation point (I, Q) to determine the b bits ($v_{b-1}$, $v_{b-2}$, . . . , $v_1$, $v_2$). For convenience of description, these b bits are identified with an integer label whose binary representation is ($v_{b-1}$, $v_{b-2}$, . . . , $v_1$, $v_2$)

It is assumed that the values of I and Q are limited by saturation to the range (X, Y). To determine V the values I=($i_{15}$, $i_{14}$, . . . , $i_1$, $i_0$) and Q=($q_{15}$, $q_{14}$, . . . , $q_1$, $q_0$) are Gray coded and then combined into V as V=(g$i_{15}$, g$q_{15}$, g$i_{14}$, g$q_{14}$, . . . ), where the upper b bits are valid.

The number of bits each carrier carries, depends on their respective Signal-to-Noise Ratios (SNR). The Signal-to-Noise Ratio is calculated for each carrier in the receiver. Based on the Signal-to-Noise Ratios, bit-loading factors are calculated for each carrier. Thus, the number of bits each carrier is to carry per transmitted symbol is decided. These bit-loading factors are calculated in an initial training session and can be updated if required. The MUSIC system uses 2-dimensional Quadrature Amplitude Modulation (QAM) on each carrier, with bit-loading factors varying from 0–12 bits.

The number of bits transmitted on each carrier may be expressed as:

$$\beta_i = b_i + \log_2(L) = \log_2\left(1 + \frac{SNR_i}{\Gamma}\right) \tag{1}$$

where Γ, the SNR gap, depends on modulation, possible coding and a system margin, and L is the constellation expansion due to the extra bits needed for coding. Using QAM constellations and some form of coding yields:

$$\Gamma = \frac{\left[Q^{-1}\left(\frac{P_s}{4}\right)\right]^2}{3} - \gamma_d + \gamma_{margin}(\text{dB}) \tag{2}$$

where $P_s$ is the desired symbol error rate, $\gamma_d$ is the gain of coding in the system, $\gamma_{margin}$ is the system margin. The system margin is a factor that is used to compensate for non-modelled losses, impulse noise etc. Equation (1) gives bit loading factors with infinite granularity. The bit-loading factors are rounded to give the supported factors (0–12 bits).

The rounding procedure will decrease the performance of the DMT system. If the energy distribution is allowed to vary energy-loading factors can be calculated for each carrier. This provides the possibility to tune the energy, so that (1) results in a bit-loading factor supported by the system. Tuning gives:

$$E_i = 2^{\frac{(\beta_i-1)\Gamma}{SNR_i}} \tag{3}$$

This can however result in very large differences between carrier energies. In an environment with several different DMT systems, peculiar effects may occur if the different energies are allowed to vary too much. The Far-End Crosstalk (FEXT) will vary significantly in such an environment, and some DMT systems may get all the capacity of the cable. To prevent these effects, only small changes of the carrier energies can be allowed. Another limiting factor is the maximum energy that is allowed on each carrier.

The input data to the bit-loading algorithm will depend on the chosen frequency domain equalizer. If an adaptive DFE is used the SNR is given by:

$$SNR_i = W_i \tag{4}$$

where $W_i$ is the estimated interference variance described above.

For each carrier, a bit-loading factor and an energy-loading factor is calculated. The bit-loading factors may be represented with 3 bits, but to prepare the system for odd bit-loading factors as well, 4 bits are recommended. For energy-loading, n bits are used to give $2^n-1$ possible factors.

Figure 20:
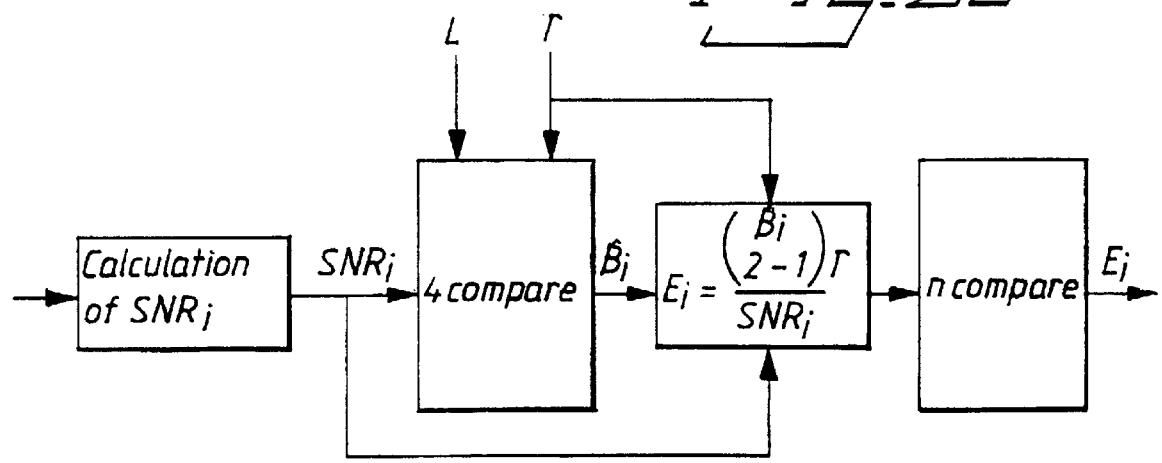
FIG. 20 illustrates, in schematic form, the realisation of the calculation of bit-loading and energy-loading factors employed in the multi-tone carrier system modem, shown in FIG. 4.

The implementation of the calculations of bit-loading and energy-loading factors can be made in four stages as illustrated in FIG. 20. To reach a given bit rate, a required SNR can be calculated and the system margin can be adjusted so that the desired bit rate is reached. The process, illustrated in FIG. 20, involves the following steps.

First the SNR is calculated using (4).

Second, four comparisons, that is one for each of the four bits representing the bit-loading factor, are carried out. The thresholds depends on L and E, and can be pre-calculated. The first comparison decides if the bit loading factor is greater than 7, the result of this comparison controls the first of the four bits representing the bit-loading factor, it also controls the threshold for the next comparison. In a similar way, this comparison control the second bit and the threshold for the next comparison. After the four comparisons, the bit-loading factor is definite.

The third step is to calculate the scale factor for the transmitted energy so that the channel is used more efficiently. The energy is scaled according to equation (3).

Finally, the scale factor is quantized to n bits.

It should be noted that to implement a system with constant energy loading, only the first two steps are necessary.

The energy loading and the shifting performed for normalization in the symbol mapping, determine the scaling and descaling factors sent to the IFFT/FFT processor.

The object of channel coding is to decrease bit error rate. The type of coding which should be used is dependent on the error pattern characteristics. Expected error sources include random noise (inducing random bit errors), impulse noise (inducing error bursts) and clipping (inducing error bursts).

Errors caused by impulse noise will primarily affect one, or two, bits per carrier. The probability for a single bit error on one carrier is always higher than the probability of 2 bit errors, which is in turn higher than the probability of 3 bit errors, and so on. This depends on the way the bits in a symbol are coded (i.e. Gray coding).

All coding depends on a synchronisation in order to determine the start-bit for the code-words and/or interleaving blocks. In a system, such as, the MUSIC modem, simple dead reckoning will be sufficient, since a data flow slip can never occur without loss of frame synchronization, or bit loading mis-adjustments. These errors will necessitate a partial, or full, system restart.

The channel coding will also include interleaving in order to increase the possibility of correcting burst errors.

Interleaving should be as deep as possible to obtain optimal working. The limiting factor on the depth is the time delay which is introduced into the system.

The difference between time and frequency interleaving is of small importance because the coding and interleaving function is not sensitive to frame boundaries.

Reed-Solomon codes have the drawback that they are primarily burst error correcting over a small number of bits (usually eight), a so called symbol. Burst errors from impulse noise will mostly introduce a single bit error in some of the symbols. To use the advantage of Reed Solomon codes, the most error prone bits have to be concentrated in one, or a few, of the Reed-Solomon symbols.

The system margin is, in itself, a sort of coding, using each carrier's margin as the symbol's redundancy. This, per symbol, redundancy should be converted to a shared redundancy that can be used by a larger number of symbols in order to handle burst errors. The higher coding rate that this imposes can be used by some types of convolutional code.

Using a convolutional code combined with soft information is, therefore, the optimal solution for a system with the MUSIC channel characteristics.

The convolutional code should be combined with interleaving. It is possible to use a top level Reed-Solomon code, or another burst error correcting code, e.g. Fire codes, in order to detect/correct the remaining bit errors. This is especially useful as these errors appear in bursts as a result of the decoding of the convolutional code.

Figure 21:
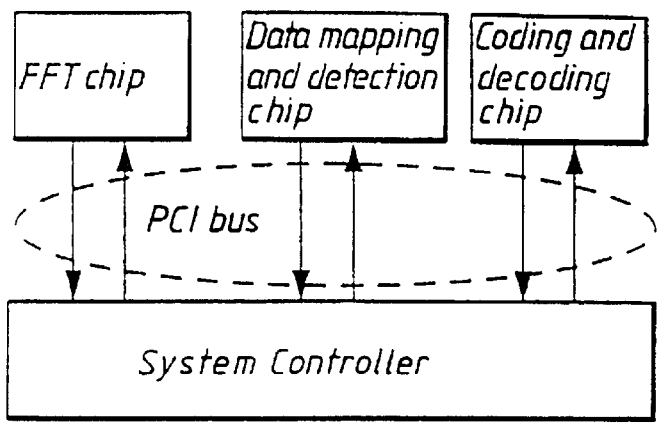

The system controller is based on a microcontroller, or signal processor, dependent on capacity requirements. For the MUSIC system the processor can be placed externally. A PCI-bus interface is used to connect the system controller and the different ASICs which make up the modem. Operation of the system controller is schematically illustrated in FIG. 21 which shows the interaction paths over a PCI bus, between the system controller and the FFT chip, the data mapping and detection chip, and the coding and decoding chip. Functions performed by the system controller are:

handling of Control Channel Signalling;
calculating bit loading and energy loading factors;
real time updating of system parameters; and
system supervision.

The system controller, used with the modem herein described, is programmable and accessible through an on-board JTAG interface.

Figure 22:
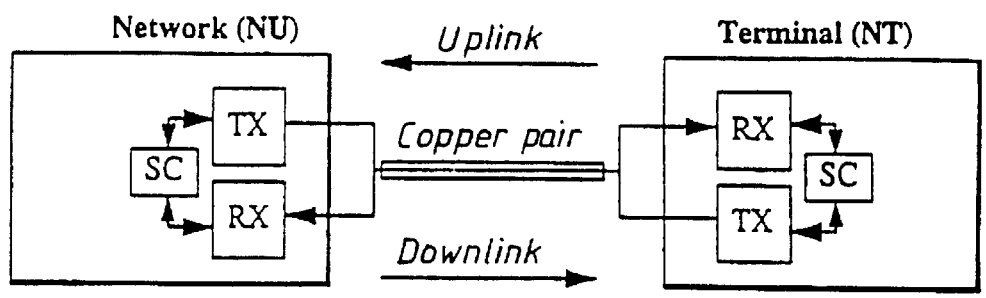
FIG. 22 illustrates, in schematic form, the manner in which two of the multi-tone carrier system modems, shown in FIG. 4, are interconnected to create a multi-tone carrier transmission system.

As shown in FIG. 22, in a modem connection, using modems herein described, the two data paths work independently of each other on the same physical copper cable, terminating in the network unit (NU) on the network side an the network termination (NT) on the user side. Both the transmitter Tx and receiver Rx are controlled by the system controller.

The system controller, after start up, calculates and updates the bit loading and energy loading factors. This updating has to be done at the same time, starting from the same frame, on both the transmit and receive side.

The calculations are done and the updating is initiated on the receiving side. The Control Channel combined with the BSI clock is used to ensure the synchronisation of the updating.

The system controller also supervises the system. Indications of system failure include the control channel starting to indicate errors, or reception of too many errors from the channel decoding unit. The system controller can initiate restart on different levels; for example, go back to "idle mode", or make a complete start up.

The Control Channel is a selected carrier that is only used for signalling between the two modems. The constellation on the carrier is initially 4 QAM and the data rate is approximately 16 kBit/s. The bit-loading can be changed to another constellation in order to increase the data rate.

The protocol on the Control Channel is partly based on HDLC for the physical layer. This means that the messages are packed as a number of octets with use of "flag sequence" and "bit-stuffing". A 16-bit "frame check sequence" ensures that every message is received correctly.

The "flag sequence", "bit-stuffing" and "frame check sequence" are handled in the hardware on the mapping and detection chip. The content of the messages is handled by the system controller.

The maximum message length is limited to 64 octets due to the size of the buffers on the mapping and detection chip.

Higher level protocols can partly be based on the CCITT Q.921 recommendations.

Figure 23:
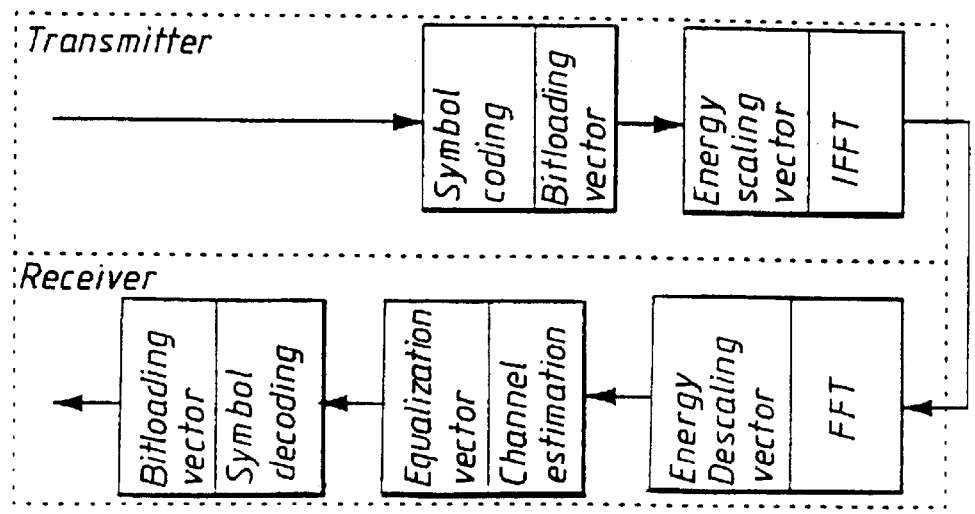
FIG. 23 illustrates, in schematic form, the vector management system employed in the multi-tone carrier system modem, shown in FIG. 4.

In the MUSIC modem SC, several different vectors are managed, these are illustrated, schematically, in FIG. 23.

For the transmitter part there are the bit-loading, and energy scaling vector. Correspondingly on the receiver side there are the bit-loading, descaling and equalization vector.

As previously described, the pilot carrier delivers a transmitter/receiver synchronization by sending and detecting a specific pattern. This clock is used by the system to synchronize changes in the transmitter and receiver vectors.

The time between the pilot synchronization patterns is called base sync interval (BSI) and is determined by the system response time, as shown in FIG. 24.

This BSI is hardware dependent. Its length will not be changed, since the response time always stays the same.

When the system is up and running there will be a synchronization, between the uplink transmitter and receiver, by the base sync interval uplink (BSI-U) and the base synch interval downlink (BSI-D), see FIG. 25. These BSI are of the exact same length but are shifted half the BSI interval.

The SC at the NU, or NT, will receive interrupts for both BSI-U and BSI-D.

For the NU there will be a transmitting BSI-D interrupt and a receiving BSI-U interrupt. By shifting the BSI-U by BSI/2, the SC load will be better distributed over the BSI period.

The bit-loading vector supplies the system with the modulation pattern for each carrier. This is a vector that needs to be held and updated, at exactly the same time for the transmitter and the receiver side, in order to supply an error free connection. By using the BSI, the vector is changed synchronously on the receiver and the transmitter side.

The bit-loading factors, constellations that are used on each carrier, are handled by two memories for receiving and two memories for transmitting on the mapping and detection chip. Each of the four memories contains a 4-bit word for each carrier (1024×4).

The system controller points to which of the memories will be used for transmit and which will be used for receive after the start from next BSI interval. The bit loading factor can have values between 0 and 12 where 0 denotes an unused carrier, 1–12 denote the number of bits in the constellation (e.g. 2 for 4QAM, 4 for 16 QAM, 10 for 1024 QAM).

The energy vector holds information on how the carriers are scaled/descaled in energy. This is a vector that needs to be updated synchronously, otherwise it will generate a distorted channel estimate and bit errors. The scaling vector will also be used as a mask for cancelled carriers.

Scaling of the different carriers on the transmitter side is handled by a memory area on the FFT chip. The memory consists of one 16-bit word for each carrier (1024×16). These values are multiplied by the vector for each carrier in the frequency domain (I and Q are multiplied with the value separately).

The memory is doubled in order to ensure a synchronous updating. The system controller points to which of the two memories will be used from the start of the next BSI interval.

A corresponding memory (doubled) is implemented on the receiving side in order to rescale the carriers before symbol detection. If these memories contain a complex value for each carrier (32 bits/carrier), only the I value will be used for rescaling.

The scaling and rescaling factors have values between 0.5 and 2.0. The value 0 is used for carrier cancelling.

The equalization vector is used to equalize the received frame according to the channel characteristics. This vector is updated periodically, independent of the other side, as the channel estimate is calculated by the receiver.

Depending on the specific transmission characteristics of a carrier, it will be assigned one of the following modes:

ordinary carrier—this carrier transmits data correspondingly to the calculated bit-loading value and are transmitter scaled and receiver descaled;

cancelled carrier—no energy is to be transmitted on this frequency and the scaling vector is, therefore, set to zero; or bad carrier, the SNR is too low to transmit any data and the bit-loading is therefore set to zero.

For carrier mode 1 (CM1) the system operates as normal. The receiver continuously estimates the channel. Equalization changes are made for each new estimate. Using the characteristics, the SC calculates the optimal bit-loading factor. This value is transferred to the transmitter using the CCH and a synchronous change is made.

For carrier mode 2 (CM2) the energy scaled/descaled value is set to zero to disable any output/input energy. The bit-loading vector value is also set to zero to indicate that the carrier is disabled. For this carrier no channel estimate can be made.

For carrier mode 3 (CM3) the receiver has calculated a zero for the bit-loading factor. On the transmitter side, this means that no data can be transmitted and, therefore, no channel estimate can be made at the receiver. To avoid this, the corresponding carrier value from the sync frame is sent, enabling channel estimation to be performed at the receiver. The scaling/descaling value can be used to lower the output power. The carrier modes are summarised in Table 4.

The basic functionality for the system start-up sequence, i.e. cold and warm boot, is now considered.

Initially the system is considered to be powered off at one, or both, ends, NU and NT. This occurs if power is lost by power failure, or by the user unplugging the NT equipment. The main considerations for the start-up is, besides the connection function, minimizing the interference level for other modems running on neighbouring cables.

The various frame types employed by the system are considered below.

1. The synch frame is used for channel estimation. This frame holds a fixed modulation pattern for every carrier, thereby enabling easy channel estimation. By letting the modulation pattern be described by a random sequence, the cross correlation inside the frame is kept low so that the frame correlation, used for synchronization, is improved.

2. Data frame 1, (DF1), carries random data on all carriers, except for four predefined carriers that transmit the control channel (CCH) in parallel. It is used at start-up when the CCH carrier is undetermined and enables the receiver to select the least disturbed carrier, thereby securing the CCH connection.

3. Data frame 2(DF2) carries random data on all carriers except one, which bears the control channel (CCH). It is used when the CCH carrier has been determined and the bit-loading factors are still not set.

4. Data frame 3 (DF3) carries data and makes use of the bit-loading functionality to maximize the bandwidth. One carrier is always dedicated to the control channel (CCH).

The system uses a special frame sequence, shown in FIG. 26, at start-up and in idle mode, called the start-up sequence (SUS).

The SUS can be composed by using the different data frames, DF1 and DF2, which are, accordingly, named SUS1 and SUS2. In the SUS frame sequence, the synch frames are used for channel estimation.

After the start-up, the synch frames are replaced with data frames, as shown in FIG. 27, and the channel estimation process switches from using synch frames to using the data frame. The data frame type for this sequence is DF3.

At system start, neither side of the modem, NU and NT, are transmitting any energy over the copper pair. The default set-up for each side, in this state, is to run the receiver, leaving the transmitter dead.

The receiver, on each side, tries to perform a frame correlation to detect a frame start. This correlation is run through a threshold function giving the receiver a distinct indication when the other side starts sending. It is this indication that operates as a wake-up signal.

The wake-up signal is only used by the NT side. If the decision to start-up is made on the NU side, the system goes directly to the "Set-up sequence", described below.

This part of the start-up procedure is timed out if a transition to the "Set-up sequence" is not detected.

Figure 28:
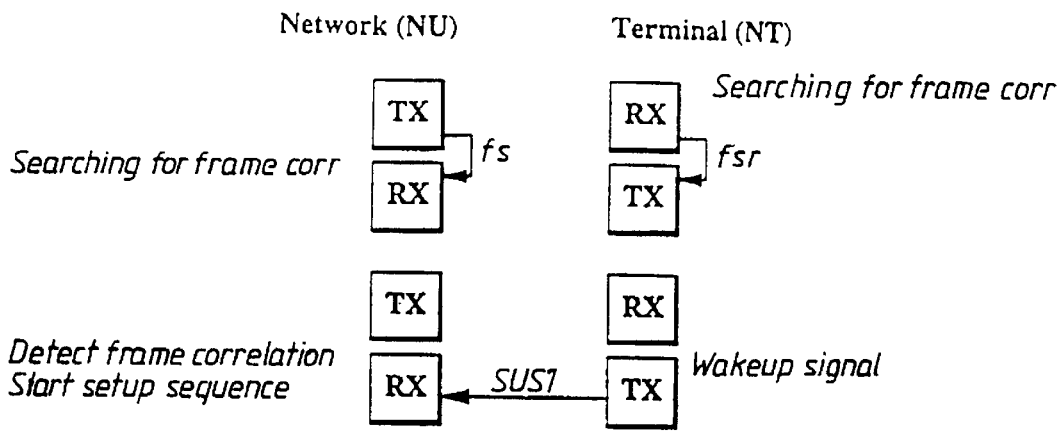
FIG. 28 illustrates, in schematic form, wake-up signalling for the multi-tone carrier system modem, shown in FIG. 4.

The basic modem wake-up signalling is illustrated in FIG. 28. Initially both modems are searching for frame correlation. One modem, on the right of FIG. 28, transmits a wake-up signal, in the form of a SUS1. The other modem detects frame correlation and starts the set-up sequence, described below.

When the wake-up state is passed, the network side (NU) initiates the "Set-up sequence".

The set-up sequence will now be considered. This set-up sequence starts after the network side has detected a wake-up signal, or the network initiates the set-up.

Figure 29:
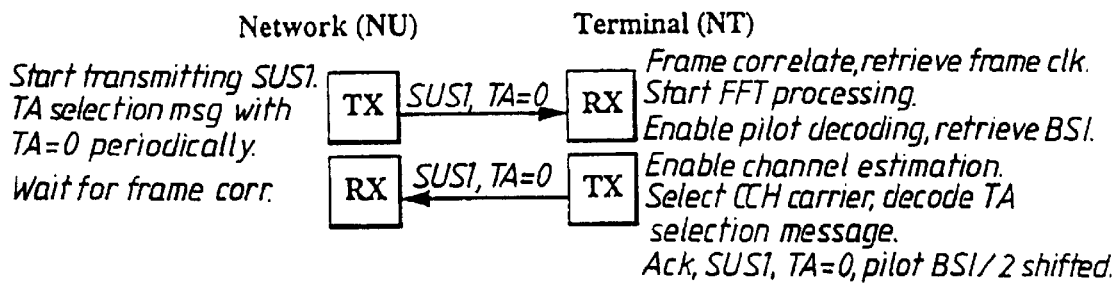
FIGS. 29 to 31 illustrate the set-up sequence for the multi-tone carrier system modem, shown in FIG. 4.

The first step of the set-up sequence is illustrated in FIG. 29. In this phase the NU starts to send the SUS1 pattern. The NU repeatedly transmits a timing advance (TA) setting, with TA zero, message on the CCH. The master clock in the system is now the NU transmit frame and sample clock. The pilot is transmitted continuously.

The NT receiver side, searching for frame correlation, detects frames and can retrieve the frame and sample clock. It now starts the channel estimation which at the current rate of sync frames calculates an accurate estimate within 300 msec. Using this estimate, the receiver starts polling the predefined CCH carriers and, upon message receive, selects this carrier for the CCH. The NT transmitter now starts with TA=0 for local timing and sends the ack on the CCH carrier for each received TA selection message, repeating the received TA value. It also shifts the outgoing pilot by BSI/2 from the incoming pilot, so that the SC load is distributed over time. When the NU detects the frame correlation, the transition to step 2, of the set-up sequence is made.

Thus, step 1 of the set-up sequence commences with the transmitter, in the network unit modem, transmitting a SUS1 and a TA message with TA=0 at periodic intervals. On receipt of this, the receiver of the terminal modem:

performs frame correlation and retrieves the frame clock;

commences FFT processing;

enables pilot decoding;

retrieves the BSI;

enables channel estimation;

selects a CCH; and decodes the TA selection message.

The transmitter in the terminal unit then transmits an ack, SUS1, a TA=0 message and a pilot shifted by BSI/2. The receiver in the network unit waits for frame correlation.

Figure 30:
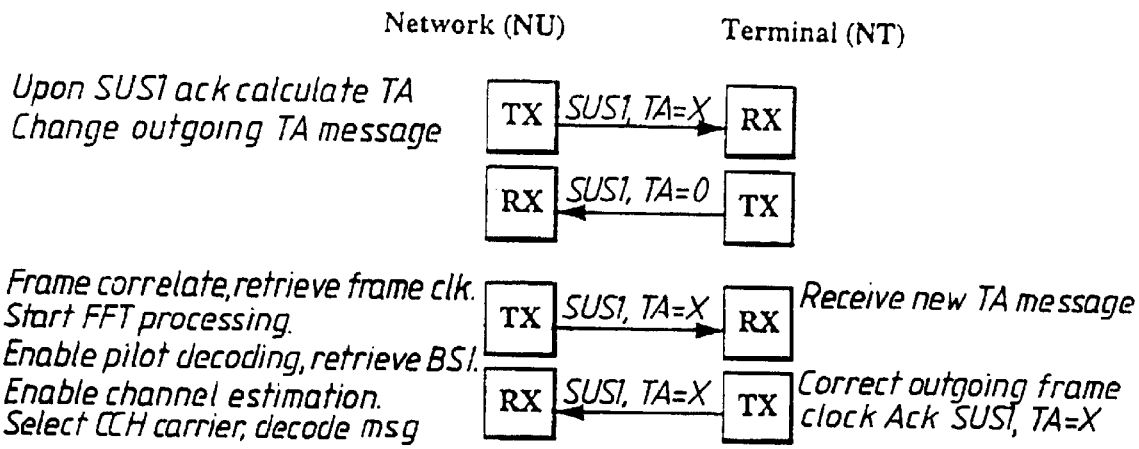

Step 2 of set-up sequence, see FIG. 30, commences with the NU side now calculating a timing advance value (TA). The CCH message is changed to the new, corrected, TA value.

When the NT side receives the new TA value it changes the local timing and continues to send the ack message, with a new TA value, for every TA selection message.

On the NU receiver, the frame clock is lost, due to the NT transmitter changing frame clock, and the unit needs to recorrelate. After the frame clock has been retrieved the CCH is decoded and, upon ack detection, containing the new TA value, the system terminates the TA message and goes to the third step of the set-up sequence.

Thus, step 2 of the set-up sequence starts with the transmitter in the network unit, NU, transmitting a TA message containing the correct TA, say X, together with a SUS1, in response to the SUS1 and TA=0 message transmitted from the terminal transmitter. The terminal unit, NT,:

receives the new TA message;

corrects the outgoing frame clock; and transmits an ack SUS1 and TA=X.

The network unit, NU,:

performs frame correlation;

retrieves the frame clock;

starts FFT processing;

enables pilot decoding;

retrieves the BSI;

enables channel estimation;

selects a CCH; and decodes the message.

Figure 31:
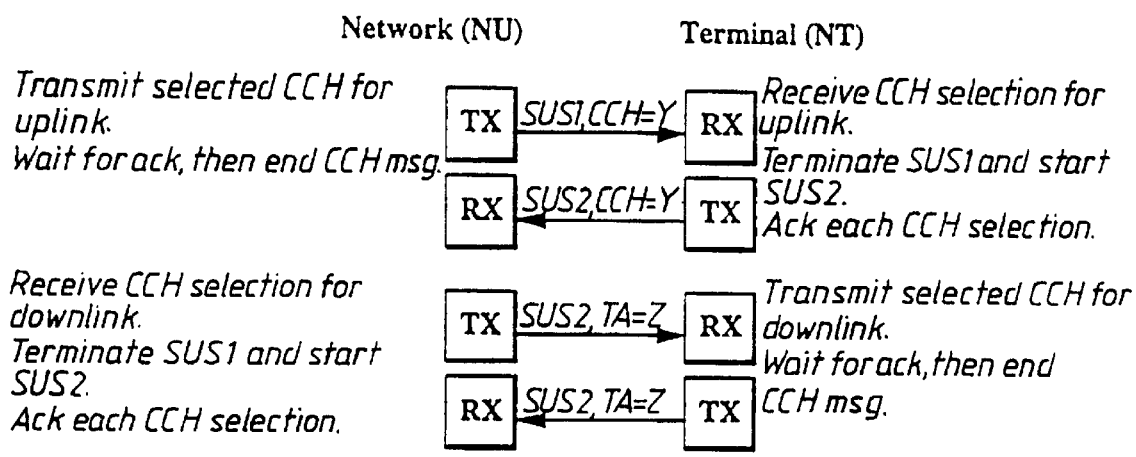

The last set-up sequence, step 3, see FIG. 31, handles the CCH choice for uplink and downlink. For the uplink, the NU receiver has selected the most suitable carrier and sends a CCH message containing this selection to the NT side. The message is sent repeatedly until it receives an ack.

On the NT side, the receiver decodes the CCH message and terminates the SUS1 and transmits a SUS2 i.e. terminates parallel CCH transmission only transmitting the CCH on the selected carrier.

The uplink CCH carrier has now been configured. For the downlink, the same steps are performed in parallel, initiated through the NT side after reception of the first CCH selection message from NU.

Thus, in step 3 the network unit:

transmits the selected CCH for the uplink;

waits for an ack; and ends the CCH message.

The terminal unit:

receives the CCH selection for the uplink;

terminates SUS1;

starts SUS2; and acknowledges each CCH selection.

The network unit then:

receives the CCH selection for the downlink;

terminates SUS1;

starts SUS2; and acknowledges each CCH selection.

The terminal unit:

transmits the selected CCH for the downlink;

waits for an ack; and ends the CCH message.

When these steps have been taken, the modem has reached idle mode, sending SUS2. Using the CCH, the bit-loading factors can now be changed according to channel characteristics and DAS transmission commences.

Figure 32:
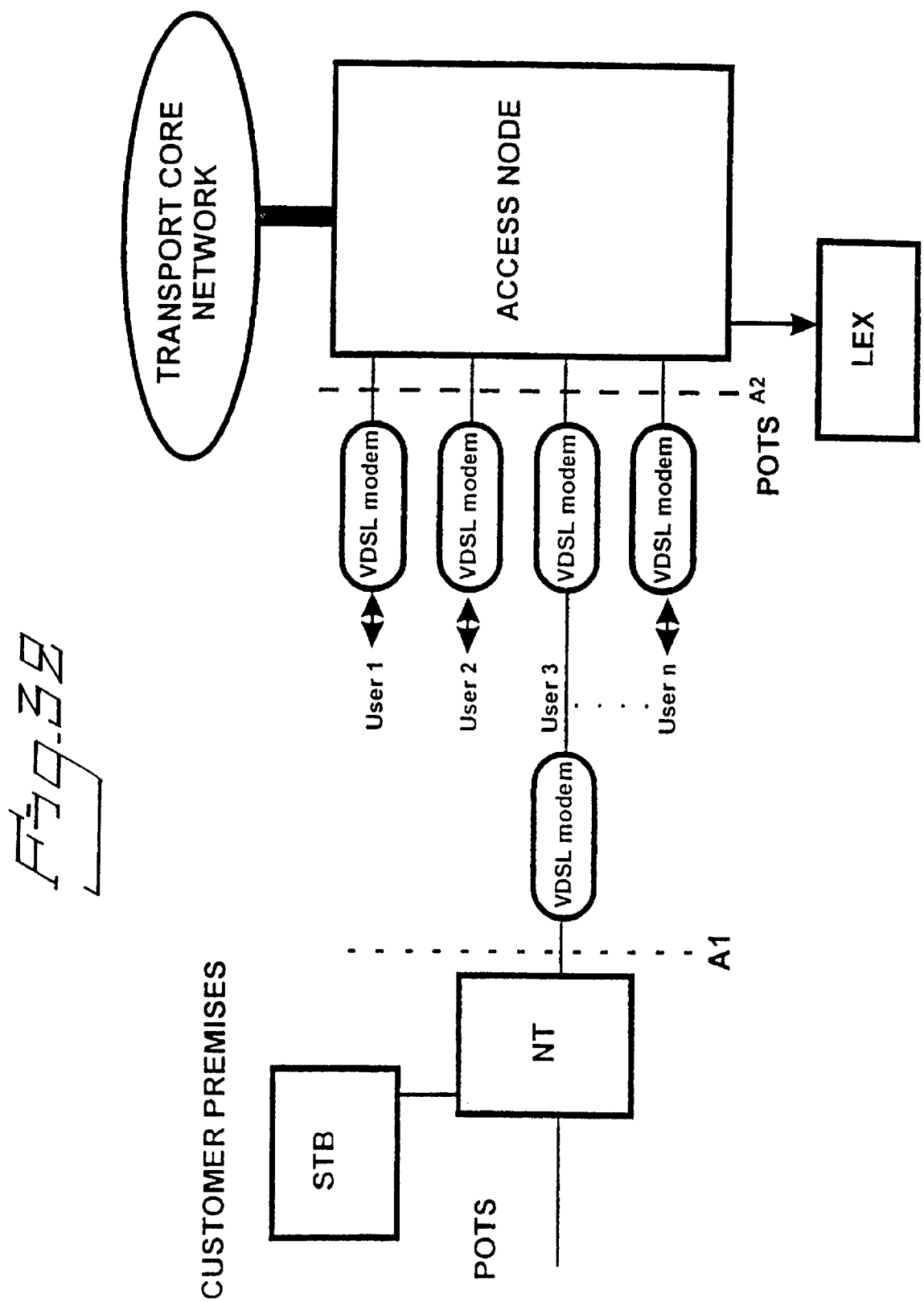
FIG. 32 illustrates, in schematic form, a network overview for a VDSL modem application network interface.

The VDSL modem can interface different network elements, depending on the physical location of the modem, i.e. at the access node premises, or at the customer premises. At the customer premises, the VDSL modem can interface an active network termination equipment. At the access node, the VDSL modem will interface an access specific interface, see FIG. 32, which shows a logical view of the networks elements that interface the VDSL modem.

The VDSL modem may be integrated physically with the network termination equipment, and the VDSL modem, at the access node, may be physically situated in the cabinet in which the access node is located.

The NT (interface A1) and the Access Node (interface A2) demand a layer 1 frame format from the VDSL modem. Integrated in the layer 1 frame are, apart from the frame header and payload, a number of information fields for management and control information. These management and control fields include different alarm indicators such as SDH alarms e.g. AIS (valid only if SDH is taken all the way to the customer premises) bit error rate measurements for performance monitoring, indications of whether synchronization is bad, or lost, equipment handling alarms for power loss and high temperature etc. The management fields also includes activation for different loop tests on the modem, for operation and maintenance purposes.

TABLE 1

System Parameters for the Overall system

| | |
|---|---|
| Orthogonality between modems | No |
| Duplex method | Separate bands |

TABLE 1-continued

System Parameters for the Overall system

| | |
|---|---|
| Frequency space between up/down data stream | Dependent on the duplex filter characteristics |
| Net bit rate | |
| up stream | 2 Mbps |
| down stream | 13 or 26 Mbps |
| Gross it rate | |
| up stream | Coding dependent |
| down stream | Coding dependent |
| Cable length | <1300 meters |
| Cable Bandwidth | 10 Mhz |
| Single carrier modulation | |
| up stream | 0–4096 QAM |
| down stream | 0–4096 QAM |
| Total no. of carriers | 1024 |
| Bandwidth of each carrier | 9.77 kHz |
| Cyclic prefix | 128 sample (carrier) |
| Modulation | DMT |
| Access technology | VDSL |
| Signal power | −60 dBm/Hz |
| Bit error rate | $10^{-7}$ |
| Interleaving delay | 0.5 ms |
| System margin | 6 dB |
| CCH | |
| bandwidth | 1 carrier, minimum 16 kbps |
| protocol | HDLC |
| Sample clk | 20 MHz ± 10 ppm |
| Frame clk | 20 MHZ/(2048+ 112) = 9.19 kHz |

TABLE 2

System Parameters for the Transmitter

| | |
|---|---|
| Interleaving | |
| depth | 2 × frames |
| delay | 0.5 ms |
| DAC resolution | 84 dB |
| Clipping Algorithm | No |
| IFFT | |
| type | Real |
| points | 2048 |
| resolution | 16 bits |
| LP-filter | LP 10 MHz |
| Bit loading | Yes, 0, 2, 4, 6, 8, 10, 12 bits |
| Energy loading | Yes, 4 bits |
| BSI distance | 1 s |

TABLE 3

System Parameters for the Receiver

| | |
|---|---|
| ADC resolution | 66 dB |
| FFT | |
| type | Real |
| points | 2048 |
| resolution | 16 bits |
| LP-filter | LP 10 MHz |
| Synchronisation | |
| jitter | <0.5 ns |
| VCXO | ±25 ppm, 10 ppm/V sensitivity |
| DAC | 18 bits, 0–5 V range |
| resolution | 1/100 of a sample |

TABLE 4

Carrier Modes

| Mode | Transmit | Bitloading | Equalize | Scaling |
|---|---|---|---|---|
| CM1 | Data | 2–12 | Yes | Yes |
| CM2 | No | 0 | No | 0 |
| CM3 | Sync info | 0 | Yes, sync | Yes, low |

What is claimed is:

1. A receiver, for use with a multi-carrier transmission system, said receiver including digitising means for sampling and quantising a received signal comprising a plurality of individual carriers, and processing means for digitally processing said sampled and quantised received signal to extract data modulated on said plurality of carriers, characterised in that said digitising means includes an analogue to digital convertor for converting said received signal to a series of digitised samples, each sample having n bits, an extremal detector for detecting when an analogue signal at an input to said analogue to digital convertor has an amplitude greater than that which can be represented by n bits, and generator means controlled by said extremal detector to generate m bits to represent each digitised sample, where m>n.

2. A receiver, as claimed in claim 1, characterised in that said digitising means is operative to minimise cutting of said digitised signal resulting from saturation of said analogue to digital convertor.

3. A receiver, as claimed in either claim 1, characterised in that a number represented by said m bits is determined by estimation from a Gaussian distribution of amplitudes.

4. A receiver, as claimed in any previous claim 1, characterised in that said received signal is passed through analogue amplitude regulation means before passing to said input of said analogue to digital convertor.

5. A receiver, as claimed in claim 1, characterised in that said generator means is a 3-to-1 multiplexor having a first input arranged to receive an n bit output from said digital to analogue convertor, a second input arranged to receive an estimate of a positive amplitude value representative of an amplitude of a sample of said received signal greater than a positive saturation value of said analogue to digital convertor, a third input arranged to receive an estimate of a negative amplitude value representative of an amplitude of a sample of said received signal less than a negative saturation value of said analogue to digital convertor, and an output for an m bit signal representative of a predicted amplitude of said input signal.

6. A receiver, as claimed in claim 1, characterised in that said multi-carrier transmission system is an orthogonal frequency division multiplex radio transmission system.

7. A receiver, as claimed in claim 1, characterised in that said multi-carrier transmission system is a DMT transmission system.

8. A receiver, as claimed in claim 7, characterised in that said multi-carrier transmission system is a DMT based VDSL system.

9. A receiver, as claimed in claim 1, characterised in that a digitised output signal from said digitising means is passed to an input of a FFT processor means.

10. A receiver, as claimed in claim 1, characterised in that a digitised output signal from said digitising means is passed to an input of a wavelet transform processor means.

11. A transceiver, including a transmitter and a receiver, characterised in that said receiver is a receiver as claimed in claim 1.

12. A multi-carrier transmission system, characterised in that said multi-carrier transmission system includes two transceivers as claimed in claim 11.

13. A transceiver, or multi-carrier transmission system, as claimed in claim 11, characterised in that said multi-carrier transmission system is a DMT system.

14. A transceiver, or multi-carrier transmission system, as claimed in claim 13, characterised in that said multi-carrier transmission system is a DMT based VDSL system.

15. A method of digitising an analogue multi-carrier signal comprising a plurality of individual carriers each of which is modulated with a data stream, in which said signal is sampled and quantised, characterised by the steps of:

sampling and quantising said analogue multi-carrier signal to produce a sequence of digital samples each of which contains n bits representing said sample amplitude;

detecting when an analogue multi-carrier signal sample has an amplitude greater than the maximum amplitude that can be represented by n bits; and generating a digital signal in which each sample is represented by m bits, where m>n.

16. A method, as claimed in claim 15, characterised by minimising cutting of said digitised signal resulting from saturation of an analogue to digital convertor used for said sampling and quantization.

17. A method, as claimed in claim 15, characterised by estimating a number represented by said m bits from a Gaussian distribution of amplitudes.

18. A method, as claimed in claims 15, characterised by regulating said analogue multi-carrier signal's amplitude prior to sampling and quantization.

19. A method, as claimed in claims 15, characterised by estimating a positive amplitude for said analogue multi-carrier signal, greater than the positive saturation value of said analogue to digital convertor, estimating a negative amplitude for said analogue multi-carrier signal, less than the negative saturation value of said analogue to digital convertor, and:

if a sample of said analogue multi-carrier signal has an amplitude lying between said positive and negative saturation values, using an output of said analogue to digital convertor to represent the amplitude of said sample of said analogue multi-carrier signal;

if a sample of said analogue multi-carrier signal has an amplitude greater than said positive saturation value, using the estimated positive value of said amplitude to represent the amplitude of said sample of said analogue multi-carrier signal; and if a sample of said analogue multi-carrier signal has an amplitude less than said negative saturation value, using the estimated negative value of said amplitude to represent the amplitude of said sample of said analogue multi-carrier signal.

20. A method, as claimed in claims 15, characterised in that said multi-carrier signal is an orthogonal frequency division multiplex signal.

21. A method, as claimed in claim 15, characterised in that said multi-carrier transmission signal is a DMT transmission signal.

* * * * *

UNITED STATES PATENT AND TRADEMARK OFFICE
CERTIFICATE OF CORRECTION

PATENT NO.   : 6,466,629 B1
DATED        : October 15, 2002
INVENTOR(S)  : Mikael Isaksson et al.

It is certified that error appears in the above-identified patent and that said Letters Patent is hereby corrected as shown below:

Column 5,
Lines 23-24, delete "system modem, shown in FIG.4" insert -- system modem, shown in FIG.4 --

Column 18,
Line 38, delete "IFFT This" insert -- IFFT. This --

Column 20,
Line 36, delete "read. and" insert -- read and --

Column 21,
Line 21, delete "). apply" insert -- ). Then apply --
Line 28, delete "⌈b/21⌈" insert -- ⌈b/2⌉ --
Line 53, delete "$\beta i = bi + \log_2(L) = \log_2\left(1 + \frac{SNR_i}{r}\right)$"

insert

-- $\beta i = bi + \log_2(L) = \log_2\left(1 + \frac{SNR_i}{\Gamma}\right)$ --

Column 22,
Line 46, delete "E" insert -- ⌈ --

Column 30,
Line 30, delete "either"
Line 33, delete "any previous"

Column 31,
Line 30, delete "claims" insert -- claim --

UNITED STATES PATENT AND TRADEMARK OFFICE
CERTIFICATE OF CORRECTION

PATENT NO. : 6,466,629 B1
DATED : October 15, 2002
INVENTOR(S) : Mikael Isaksson et al.

It is certified that error appears in the above-identified patent and that said Letters Patent is hereby corrected as shown below:

<u>Column 32,</u>
Lines 1 and 25, delete "claims" insert -- claim --

Signed and Sealed this

Twenty-sixth Day of August, 2003

JAMES E. ROGAN
*Director of the United States Patent and Trademark Office*